United States Patent
Mazliach et al.

(10) Patent No.: US 11,128,819 B2
(45) Date of Patent: Sep. 21, 2021

(54) COMBINED SPECTRAL MEASUREMENT AND IMAGING SENSOR

(71) Applicant: ADVANCED VISION TECHNOLOGY (A.V.T.) LTD., Hod Hasharon (IL)

(72) Inventors: Tsachi Mazliach, Rinatya (IL); Barry Ben Ezra, Ramat Hasharon (IL); Alan Then, Addison, TX (US); Brian Gamm, McKinney, TX (US)

(73) Assignee: Advanced Vision Technologies (A.V.T.) Ltd., Hod Hasharon (IL)

( * ) Notice: Subject to any disclaimer, the term of this patent is extended or adjusted under 35 U.S.C. 154(b) by 0 days.

(21) Appl. No.: 16/300,529

(22) PCT Filed: May 9, 2017

(86) PCT No.: PCT/IL2017/050509
§ 371 (c)(1),
(2) Date: Nov. 9, 2018

(87) PCT Pub. No.: WO2017/195195
PCT Pub. Date: Nov. 16, 2017

(65) Prior Publication Data
US 2019/0289228 A1    Sep. 19, 2019

Related U.S. Application Data

(60) Provisional application No. 62/334,468, filed on May 11, 2016, provisional application No. 62/488,869, filed on Apr. 24, 2017.

(51) Int. Cl.
*H04N 5/33* (2006.01)
*G01J 3/02* (2006.01)
(Continued)

(52) U.S. Cl.
CPC ............ *H04N 5/332* (2013.01); *G01J 3/0248* (2013.01); *G01J 3/2803* (2013.01); *G01J 3/36* (2013.01);
(Continued)

(58) Field of Classification Search
CPC ....... G01J 2003/1213; G01J 2003/1217; G01J 2003/2806; G01J 2003/2813;
(Continued)

(56) References Cited

U.S. PATENT DOCUMENTS 5,146,321 A    8/1992 Lees et al.
6,292,212 B1    9/2001 Zigadlo et al.
(Continued)

FOREIGN PATENT DOCUMENTS

WO    2013/064510 A1    5/2013
WO    2014/140189 A2    9/2014

OTHER PUBLICATIONS

"Hyperspectral Imaging" Introduction 2015, IMEC.
(Continued)

*Primary Examiner* — Sath V Perungavoor
*Assistant Examiner* — Tyler B Edwards
(74) *Attorney, Agent, or Firm* — RatnerPrestia

(57) ABSTRACT

A combined imaging and spectral measurement line-scan imaging sensor includes a plurality of pixel lines. Each pixel line includes a plurality of pixels. At least one of the pixel lines is an imaging line designated for acquiring at least one image of an object and other of the pixel lines are spectral measurement lines designated for acquiring a spectral measurement of light received from the object. Each imaging line is associated with a single respective spectral response within a spectral range. Each pixel in each spectral measurement line is associated with a respective spectral band. Each of at least three pixels in each of the spectral mea-
(Continued)

surement lines is respectively associated with different respective pixel spectral bands. The different respective pixel spectral bands are non-identical to any one of the single spectral responses associated with each of the imaging spectral lines.

32 Claims, 17 Drawing Sheets

(51) Int. Cl.
    *G01J 3/28*         (2006.01)
    *H04N 9/04*       (2006.01)
    *G01J 3/36*         (2006.01)
    *H04N 5/369*      (2011.01)
    *G01J 3/51*         (2006.01)
    *G01J 3/12*         (2006.01)

(52) U.S. Cl.
    CPC ........... *H04N 5/3692* (2013.01); *H04N 9/045* (2013.01); *G01J 3/51* (2013.01); *G01J 2003/1213* (2013.01); *G01J 2003/1217* (2013.01); *G01J 2003/2806* (2013.01); *G01J 2003/2813* (2013.01)

(58) Field of Classification Search
    CPC .......... G01J 3/0248; G01J 3/2803; G01J 3/36; G01J 3/51; H04N 1/19505; H04N 1/486; H04N 1/488; H04N 5/332; H04N 5/3692; H04N 9/045
    See application file for complete search history.

(56) References Cited

U.S. PATENT DOCUMENTS

| | | | |
|---|---|---|---|
| 7,554,586 B1 | 6/2009 | Imai et al. | |
| 7,566,855 B2 | 7/2009 | Olsen et al. | |
| 7,835,002 B2 | 11/2010 | Muhammed et al. | |
| 8,081,244 B2 | 12/2011 | Golub et al. | |
| 8,179,436 B2 | 5/2012 | Sorgius | |
| 8,368,002 B2* | 2/2013 | Hosier | G01J 3/12 250/226 |
| 2002/0158978 A1* | 10/2002 | Gann | H04N 1/486 348/272 |
| 2011/0089316 A1* | 4/2011 | Hosier | G01J 3/12 250/252.1 |
| 2012/0257047 A1 | 10/2012 | Biesemans et al. | |
| 2013/0271766 A1 | 10/2013 | Richards | |
| 2015/0136955 A1* | 5/2015 | Wein | G01J 3/2823 250/208.1 |
| 2016/0050376 A1* | 2/2016 | Fridental | H04N 5/374 348/302 |

OTHER PUBLICATIONS

B. Delauré et al., "The Geospectral Camera: A Compact and Geometrically Precise Hyperspectral and High Spatial Resolution Imager", International Archives of the Photogrammetry, Remote Sensing and Spatial Information Sciences, vol. XL-1/W1, ISPRS Hannover Workshop 2013, May 21-24, 2013, Hannover, Germany.
James Miller et al., "Hyperspectral and multispectral sensors for remote sensing" 2010 Abstract.
Vision Systems Design, "Image Capture: CMOS cameras employ hyperspectral sensors", Jan. 12, 2015.
"Hyperspectral Image Sensors Exploit Mosaic-Filter Architecture", sensors Online, imec USA, Feb. 4, 2015.
"The partnership will enable new opportunities in multi-spectral and hyperspectral imaging thanks to highly compact and low-weight camera solutions", Imec Technology Forum—Brussels (Belgium)—Jun. 4, 2014.
"Dalsa to Present on "Hyperspectral and Multispectral Image Sensors for Remote Sensing" at the SPIE International Symposium", Teledyne DALSA, Sep. 20, 2010.
International Search Report and Written Opinion for PCT/IL2017/050509, dated Aug. 31, 2017.
European Communication pursuant to Article 94(3) for European Application No. 17 795 737.0, dated Feb. 9, 2021, 6 pages.

* cited by examiner

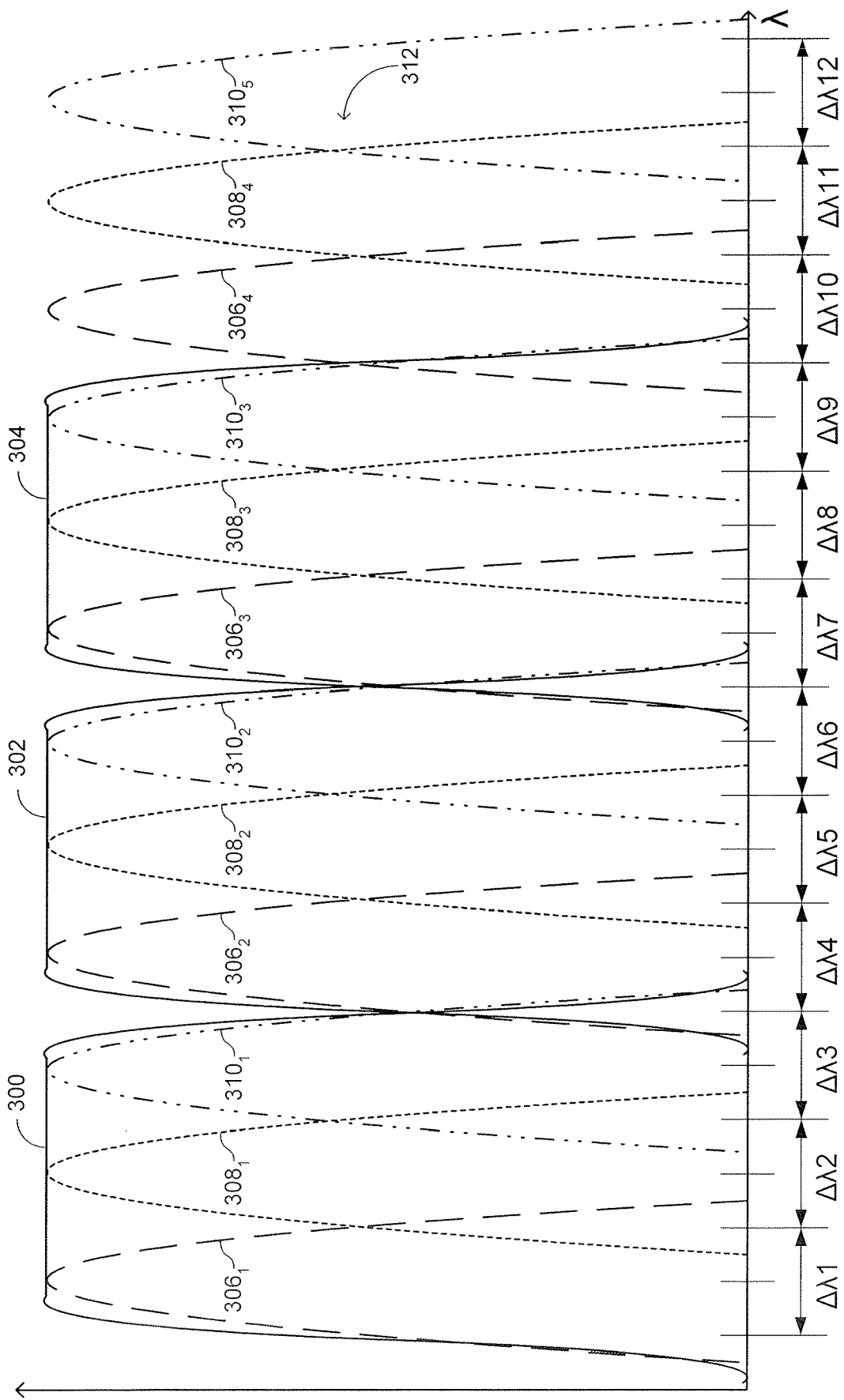

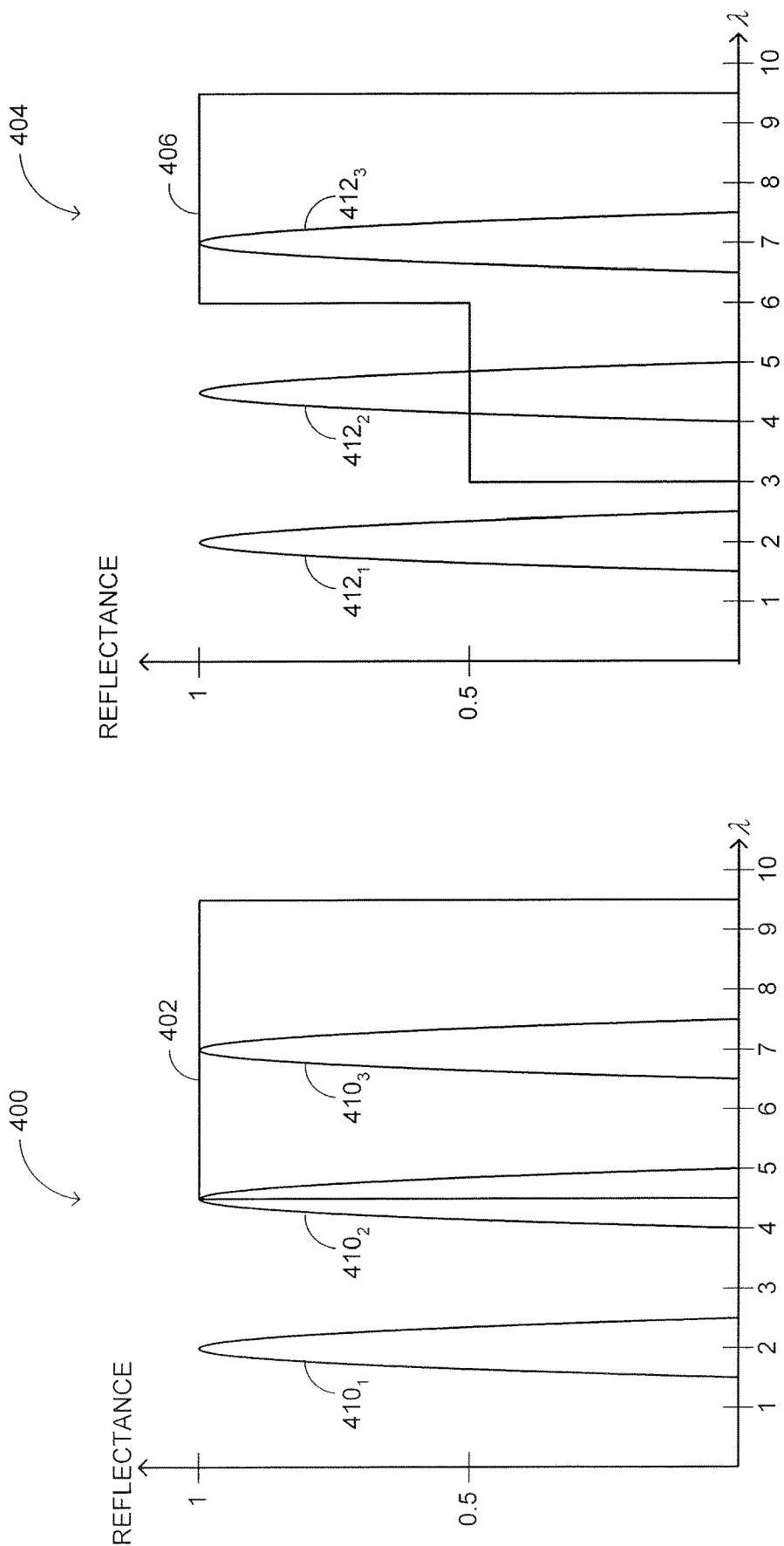

COMBINED SPECTRAL MEASUREMENT AND IMAGING SENSOR

This application is a National Stage application of PCT/IL2017/050509, filed May 9, 2017, which claims priority to U.S. Provisional Patent Application No. 62/334,468, filed May 11, 2016, and U.S. Provisional Patent Application No. 62/488,869, filed Apr. 24, 2017, which applications are incorporated herein by reference. To the extent appropriate, a claim of priority is made to each of the above-disclosed applications.

FIELD OF THE DISCLOSED TECHNIQUE

The disclosed technique relates to imaging sensors in general, and to a combined imaging and spectral measurement line scan sensor in particular.

BACKGROUND OF THE DISCLOSED TECHNIQUE

Imagers for measuring the spectrum of light received (e.g., reflected off or transmitted through) from an object are known in the art. Generally, such imagers are referred to as hyperspectral imagers. Such imagers normally employ one of the known in the art techniques such as spatial scanning, spectral scanning, non-scanning or spatio-spectral scanning to spectrally decompose the light entering the imager and generate a hyperspectral image cube. Also known in the art are imagers which acquire image data at selected spectral bands, such as Red, Green and Blue. The wavelengths may be separated by filters. Known in the art techniques, for simultaneously acquiring both a spectral measurement and an image at selected spectral bands require employing two or more sensors, or computing the selected spectral image from the hyperspectral data.

PCT Publication WO 2013/064510 to Geelen et al, entitled "Spectral Camera with Mosaic of Filters for each Image Pixel," directs to a hyperspectral imaging camera, in which each spatial point sensed in the scene, is spread over a cluster of sensor elements in a sensor array. Geelen directs to material and manufacturing processes for producing Fabry-Perot filters monolithically with the image sensors. According to one embodiment, each cluster of sensor elements has a mosaic of different band pass filters. The clusters of sensor elements produce multiple copies of an image, each copy associated with a respective band. The images can be detected, read out, and stored as a reassembled hyperspectral image cube.

Further according to Geelen et al, each mosaic of sensors may contain a selection of spectral bands with equal bandwidths (i.e., equal wavelength resolution), repeated over the surface of the image sensor. Also, some bands can appear alternately (with lower spatial frequency) in the mosaics of sensors. Furthermore, some spectral bands can have different wavelength resolutions than other bands in the spectrum, or band selection can vary in different parts of the image, such as the periphery and the center of the image sensor. A processor reassembles the image for each band, employing interband prediction methods to estimate spectral data at higher spatial resolution than the spatial cluster frequency. An anti-aliasing part in the optical path can spread the image, for example, by optical filtering or by defocusing. Higher-order filters can be present in order to subtract unwanted higher-order signals from the first-order filtered signals.

U.S. Pat. No. 7,566,855 to Olsen et al, entitled "Digital Camera with Integrated Infrared (IR) Response" directs to a digital camera system which includes a plurality of separate photo detector arrays. For example, one photo detector array samples light of a visible spectrum another photo detector array samples infrared (IR) radiation. However, the photo detector arrays are all integrated on or in the same semiconductor substrate. Further integrated on the same semiconductor substrate is a signal processing circuit which generates a composite image using the data representing the intensity of light sampled by the photo detectors.

U.S. Pat. No. 6,292,212 to Zigadlo et al, entitled "Electronic Color Infrared Camera" directs to digital electronic camera which includes a solid state color image sensor having an array of image sensing elements and an array of color filters arranged over the image sensing elements for producing a color image. The filters include infrared filters that block blue light and pass infrared light. The camera further includes a signal processing circuit for processing the image signals from the sensor to produce a false color image.

SUMMARY OF THE PRESENT DISCLOSED TECHNIQUE

It is an object of the disclosed technique to provide a novel imaging sensor. In accordance with the disclosed technique, there is thus provided a combined imaging and spectral measurement line-scan imaging sensor. The imaging sensor includes a plurality of pixel lines. Each pixel line includes a plurality of pixels. A at least one of the pixel lines is an imaging line designated for acquiring at least one image of an object and one other of the pixel lines are spectral measurement lines designated for acquiring a spectral measurement of light received from the object. Each imaging line is associated with a single respective spectral response within a spectral range. Each pixel in each spectral measurement line is associated with a respective spectral band. Each of at least three pixels in each of the spectral measurement lines is respectively associated with different respective pixel spectral bands. The different respective pixel spectral bands are non-identical to any one of the single spectral responses associated with each the imaging spectral lines.

BRIEF DESCRIPTION OF THE DRAWINGS

The disclosed technique will be understood and appreciated more fully from the following detailed description taken in conjunction with the drawings in which:

FIGS. 6A-6F are schematic illustrations of exemplary spectral responses of filters in accordance with another embodiment of the disclosed technique;

FIGS. 9A-9H are a schematic illustration of an example of the effects of overlap of the spectral sensitivity curves associated with spectrally adjacent filters as well as the effects of quantization, in accordance with a further embodiment of the disclosed technique.

DETAILED DESCRIPTION OF THE EMBODIMENTS

The disclosed technique overcomes the disadvantages of the prior art by providing a combined imaging and spectral measurement line-scan sensor array, which includes a plurality of sensor elements lines, each line including a plurality of sensor elements. The combined imaging and spectral measurement line-scan sensor array is integrated on a single semiconductor substrate. Herein, sensor elements are also referred as 'pixels'. According to one alternative, a portion of the pixel lines are designated for acquiring an image, referred to herein as 'imaging lines' while the remaining portion of the pixel lines are associated with spectral measurements and referred to herein as 'spectral measurement lines'. According to another alternative, all of the pixel lines are imaging lines. Each imaging line acquires an image over a respective spectral band. The spectral bands may be mutually exclusive, partially overlapping or completely overlapping. As such, an image acquired by the imaging lines by a color image in a selected color space (e.g., Red, Green and Blue—RGB, Cyan Magenta Yellow—CYM, XYZ and the like) as well as an image in the Short Wave Infrared (SWIR) and the Long Wave Infrared (LWIR) spectral bands or any combination thereof.

Each imaging line is associated with a respective spectral band referred to herein as the 'line spectral band'. Each pixel in each spectral measurement line is associated with a respective spectral band referred to herein as the 'pixel spectral band'. Each of multiple (e.g., of at least three, at least four, at least five etc.) pixels in each of spectral measurement lines is respectively associated with different respective pixel spectral bands. The different respective pixel spectral bands are non-identical to any one of the line spectral bands associated with each of the imaging spectral lines. In general, the line spectral bands are substantially larger (i.e., exhibit a larger bandwidth) than the pixel spectral band. Also, each spectral measurement line may be divided into a plurality of groups of adjacent pixels. Each group is associated with the same group spectral range and each pixel in the group is associated with a respective pixel spectral band.

Figure 1:
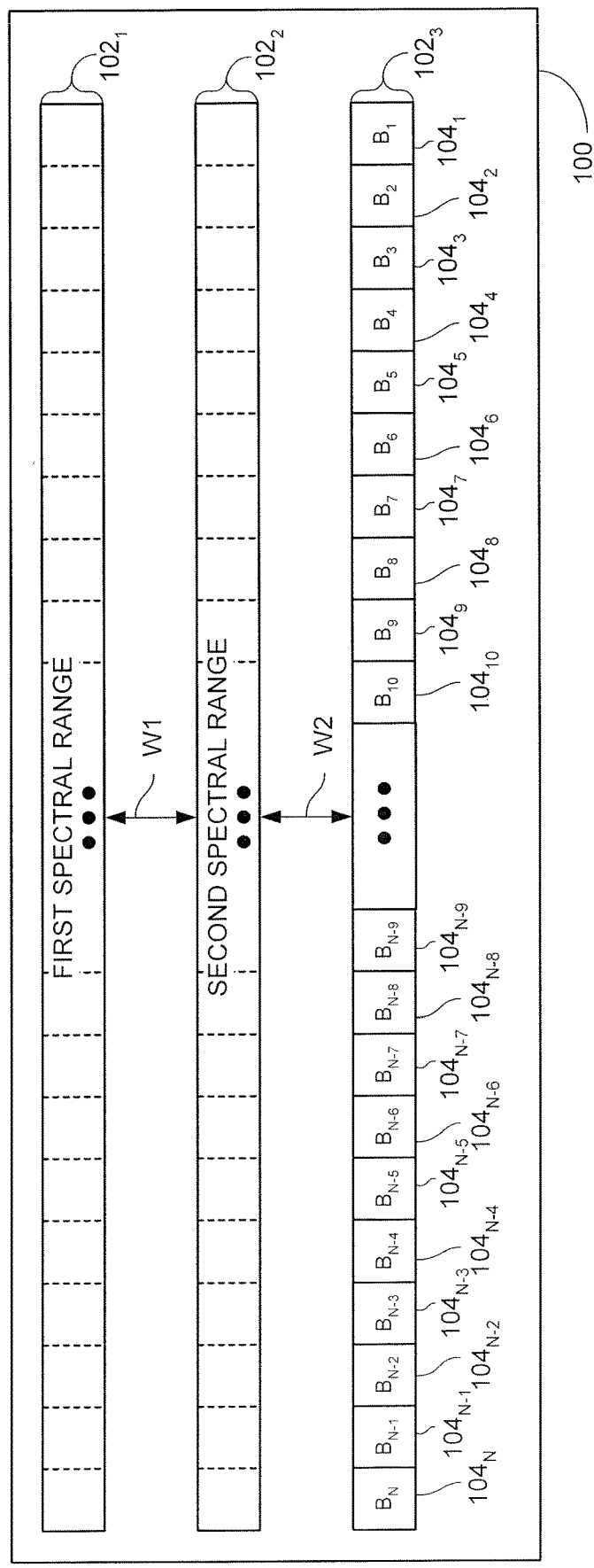
FIG. 1 is a schematic illustration of a combined spectral measurement and imaging line-scan sensor, constructed and operative in accordance with an embodiment of the disclosed technique.

Reference is now made to FIG. 1, which is a schematic illustration of a combined imaging and spectral measurement line-scan sensor, generally referenced 100, constructed and operative in accordance with an embodiment of the disclosed technique. Imaging sensor 100 includes three pixel lines $102_1$, $102_2$ and $102_3$. Lines $102_1$ and $102_2$ are imaging lines for acquiring images over selected spectral bands. Each one of lines $102_1$ and $102_2$ is associated with a respective line band. Line $102_1$ is associated with a first one spectral band and line $102_2$ is associated with a second line spectral band. For example, line $102_1$ is associated with the visible part of the spectrum (i.e., the first line spectral band is in the visible part of the spectrum) and line $102_2$ is associated with the infrared (IR) part of the spectrum (i.e., the second line spectral band is in the IR part of the spectrum). The first line spectral band and the second line spectral band are either mutually exclusive, partially overlap or completely overlap within the same part of the spectrum. For example, the first line spectral band is Near Infrared (NIR) and the second line spectral band is Far infrared (FIR). As a further example, the first line spectral band is between 380 nanometers (nm) and 600 nm and the second line spectral band is between 500 nm and 710 nm. Accordingly, a filter exhibiting the desired respective response over the line spectral band (i.e., either a similar response or a different response) is placed over the pixels in lines $102_1$ and $102_2$.

Line $102_3$ is a spectral measurement line, for example, for measuring the spectrum of light received (e.g., reflected) from an object. Each one of pixels $104_1$-$104_N$ in line $102_3$ is associated with a respective one of pixel spectral bands $B_1$-$B_N$. Accordingly, a filter (e.g., a Fabry-Perot filter) exhibiting a response over the desired spectral band is placed over each one of pixels $104_1$-$104_N$ in lines $102_3$. It is noted that the term 'placed' herein above and below relates to the physical association between a filter and respective pixel of group of pixels. In practice, for example, the filter or filters to be placed over pixels in an imaging sensor may be produced on a glass plate, covering the sensor area. The glass plate is then positioned over the sensor in alignment with the pixels. Also, the filter or filters may be directly deposited on the sensor itself. It is further noted that in FIG. 1, the dashed lines represent pixels and the solid lines represent filters over pixels In general, within spectral measurement line $102_3$, each of multiple pixels $104_1$-$104_N$ is respectively associated with different respective spectral band (i.e., multiples of spectral bands $B_1$-$B_N$ are different from each other). The different respective pixel spectral bands are non-identical to any one of the single spectral responses associated with each of the imaging spectral lines. Furthermore, these spectral bands need not be adjacent to each other (i.e., may not result in a single continuous band).

Optionally, as depicted in FIG. 1, spacing exists between lines $102_1$, $102_2$ and $102_3$. In FIG. 1 a gap, 'W1', exists between line $102_1$ and line $102_2$ and a gap, 'W2' exists between line $102_2$ and line $102_3$. Gap W1 prevents light from the filters located over the pixels in line $102_1$ to be received by the pixels in line $102_2$ and vice versa. Similarly, Gap W2 prevents light from the filters located over the pixels in line $102_2$ to be received by the pixels in line $102_3$ and vice versa.

It is noted that a combined imaging and spectral measurements line-scan sensor may include more than two imaging lines and more than one spectral measurement lines. For example, when acquiring a Cyan, Magenta, Yellow and Black (CMYK) image simultaneously with a spectral measurement of the light reflected of object being imaged, an imaging sensor according to the disclosed technique shall include at least five lines, four imaging lines and one spectral measurement line. Three imaging lines exhibit a spectral response corresponding to cyan, magenta and yellow (i.e., in the visible part of the spectrum) and the fourth imaging line exhibit a spectral response in the IR part of the spectrum from which the value of black is derived. The fifth line is a spectral measurement line similar to the spectral measurement line described above. Also, each spectral measurement line may be divided into a plurality of groups of adjacent pixels. Each group is associated with the same group spectral range and each pixel in the group is associated with a respective pixel spectral band.

Figure 2:
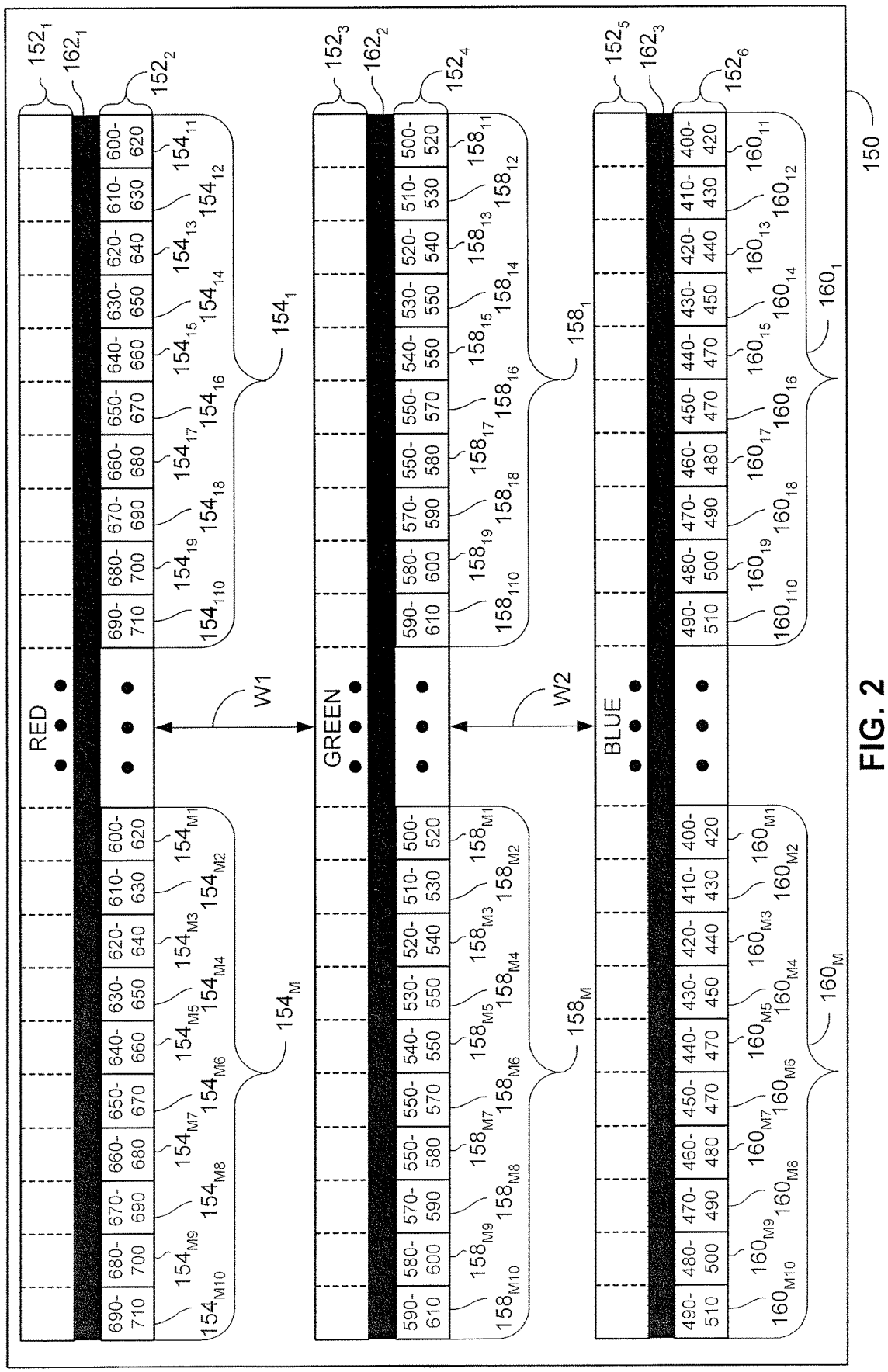
FIG. 2 is a schematic illustration of an exemplary combined spectral measurement and imaging line-scan sensor constructed and operative in accordance with another embodiment of the disclosed technique.

Reference is now made to FIG. 2, which is a schematic illustration of another exemplary combined imaging and spectral measurement sensor, generally referenced 150, constructed and operative in accordance with another embodiment of the disclosed technique. Exemplary sensor 150 acquires images in the visible part of the spectrum. Exemplary sensor 150 includes 6 lines of sensors $152_1$-$152_6$. Lines $152_1$, $152_3$ and $152_5$ are imaging lines associated with and lines $152_2$, $152_4$ and $152_6$ are spectral measurement lines associated. In FIG. 2, the dashed lines represent pixels and the solid lines represent filters over pixels.

Each of one imaging lines $152_1$, $152_3$ and $152_5$ is associated with a single respective line spectral response. To that end, a filter exhibiting a response in the desired spectral band is placed over the pixels in each line. In sensor 150, the spectral response associated with line $152_1$ is in the long visible band also referred to herein as "red spectral band" (e.g., between 600 nm and 710 nm). The spectral response associated with line $152_3$ is in the medium visible bands (e.g., between 500 nm and 610 nm) also referred to herein as "green spectral bands". The spectral response associated with line $152_5$ is in the short visible band (e.g., between 400 nm and 510 nm) also referred to herein as "blue spectral band".

Also in sensor 150, each one of spectral measurement lines $152_2$, $152_4$ and $152_6$ is divided into a plurality of groups of adjacent pixels. Spectral measurement line $152_2$ is divided into groups $154_1$-$154_M$. Spectral measurement line $152_4$ is divided into groups $158_1$-$158_M$ and spectral measurement line $152_6$ is divided into groups $160_1$-$160_M$. Each group in each spectral measurement line is associated with the same group spectral range. Thus, the spectral band associated with groups $154_1$-$154_M$ is between 600 nm and 710 nm. The spectral band associated with groups $158_1$-$158_M$ is between 500 nm and 610 nm and the spectral band associated with groups $160_1$-$160_M$ is between 400 nm and 510 nm.

Furthermore, the corresponding pixels in each group of pixels are associated with the same respective pixel spectral band. To that end, a filter (e.g., a Fabry-Perot filter) exhibiting a response in the desired spectral band is placed over each pixel. For example, pixels $154_{11}$, $154_{21}$, ..., $154_{M1}$ are associated with the same spectral band (i.e., 600-620), pixels $158_{11}$, $158_{21}$, ..., $158_{M1}$ are associated with the same spectral band (i.e., 500-520) and pixels $160_{11}$, $160_{21}$, ..., $160_{M1}$ are associated with the same spectral band (i.e., 400-420). Similarly, pixels $154_{12}$, $154_{22}$, ..., $154_{M2}$ are associated with the same spectral band (i.e., 610-630), pixels $158_{12}$, $158_{22}$, ..., $158_{M1}$ are associated with the same spectral band (i.e., 510-530) and pixels $160_{12}$, $160_{22}$, ..., $160_{M2}$ are associated with the same spectral band (i.e., 410-430) etc. In general, similar to as mentioned above, within at least one of spectral measurement lines $152_2$, $152_4$ and $152_6$ each of multiple pixels is respectively associated with different respective pixel spectral bands. The different respective pixel spectral bands are non-identical to any one of the single spectral responses associated with each of the imaging spectral lines.

Optionally, as depicted in FIG. 2, spacing exists between lines $152_1$-$152_6$. In FIG. 2, a gap, 'W1', exist between line $152_2$ and line $152_3$ and a gap, 'W2' exists between line $152_4$ and line $152_5$. Gap W1 prevents light from the filters located over the pixels in line $152_2$ to be received by the pixels in line $152_3$ and vice versa. Similarly, Gap W2 prevents light from the filters located over the pixels in line $152_4$ to be received by the pixels in line $152_5$ and vice versa. Also optionally, opaque strips, such as metal strips $162_1$ $162_2$ and $162_3$ are positioned between line $152_1$ and $152_2$, between line $152_3$ and $152_4$, between line $152_5$ and $152_6$ respectively. Metal strip $162_1$ prevents light from the filters located over the pixels in line $152_1$ to be received by the pixels in line $152_2$ and vice versa. Metal strip $162_2$ prevents light from the filters located over the pixels in line $152_3$ to be received by the pixels in line $152_4$ and vice versa. Metal strip $162_3$ prevents light from the filters located over the pixels in line $152_5$ to be received by the pixels in line $152_6$ and vice versa. In general, a metal strip and a gap provide the same functionality (i.e., a metal strip and a gap are interchangeable). However, the width of a metal strip may be smaller than the width of a gap but fabricating a metal strip may be more complex. The term 'spacing' herein above and below relate to a gap or an opaque strip. Also a metal strip is brought herein as an example only. Any opaque material suitable for fabrication on the sensor substrate may be employed. Furthermore, a combination of an opaque strip and a gap may also be employed.

It is noted that spacing is required between the lines due to the uncertainty in the size of each pixel and filter regardless of the spectral response of the filters. For example, two adjacent pixels may exhibit width of 10 micrometers. However the filters placed over these pixels may exhibit widths different from 10 micrometers (e.g., due to manufacturing tolerances). As such, there is a probability that the coverage of a filter associate with one pixel overlaps adjacent pixels. Therefore, employing spacing such as described above alleviates such an uncertainty and result in a one to one correspondence between a filter and corresponding pixel or pixels. Nevertheless, when the process employed during manufacturing of an imaging sensor of the disclosed technique results in a sufficiently low probability that the coverage of a filter associated with one pixel would overlap adjacent pixels, then the use of metal strips or spacing may not be necessary. For example, the process employed may result in a probability of 1 percent that a filter shall overlap with a neighboring pixel by at most 100 nanometers. The designer may decide that with such probability and overlap, the performance of the sensor (e.g., Signal to Noise Ratio—SNR) would not be affected such that the sensor is rendered un-usable. As such, the designer may decide that opaque strips or spacing are not necessary.

Figure 3:
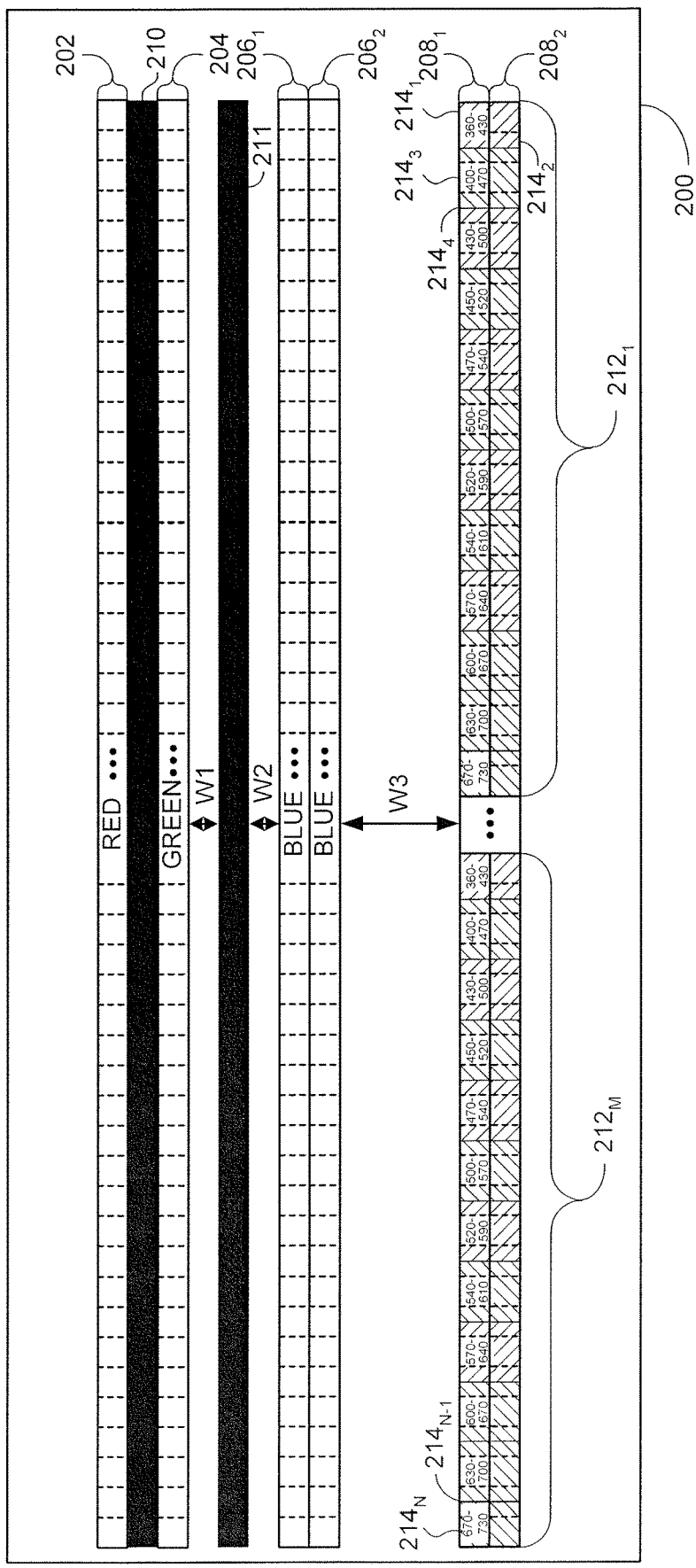
FIG. 3 is a schematic illustration of another exemplary combined spectral measurement and imaging line-scan sensor constructed and operative in accordance with a further embodiment of the disclosed technique.

Reference is now made to FIG. 3, which is a schematic illustration of another exemplary combined imaging and spectral measurement sensor, generally referenced 200, constructed and operative in accordance with a further embodiment of the disclosed technique. In sensor 200, Lines 202, 204, $206_1$, $206_2$ are imaging lines and lines $208_1$ and $208_2$ are spectral measurement lines. In FIG. 3, the dashed lines represent pixels and the solid lines represent filters over the pixels. Each one of imaging lines 202, 204, 206₁, 206₂ is associated with a single respective line spectral band.

Line 202 is an imaging line associated with the red spectral band. Accordingly, each of the pixels in line 202 includes a respective filter (e.g., a red dichroic filter). Line 204 is an imaging line associated with the green spectral band. Accordingly, each of the pixels in line 204 includes a respective filter (e.g., a green dichroic filter). Lines 206₁ and 206₂ are imaging lines associated with the blue spectral band. As such, similar to lines 202 and 204, each of the pixels in lines 206₁ and 206₂ includes a respective filter (e.g., a blue dichroic filter). When employed for line scanning (similarly to as explained below in conjunction with FIG. 6), Time Delay Integration (TDI) may be employed with blue pixels in lines 206₁ and 206₂ thereby increasing the sensitivity of sensor 200 in the blue spectral band. It is noted that two imaging lines associated with the blue spectral response are employed since, in general, the pixels may exhibit a weaker response in the blue spectral than in the red and the green spectral bands. Furthermore, the lighting employed with the blue sensor may exhibit weaker emission in the blue spectral band than in the red and the green spectral bands. However, in general, either one of the red, blue or green spectral bands may be associated with one or more respective pixel lines.

Optionally, an opaque strip such as metal strip 210 is positioned between line 202 and 204. This metal strip prevents light from the filters located over the pixels in line 202 to be received by the pixels in line 204. Also optionally, line 204 and line 206₁ are separated with a combination of a metal strip 211 and two gaps 'W1' between line 204 and metal strip 211 and a gap 'W2' between metal strip 211 and line 206₁. 'W2', separate line 206₂ and line 208₁. Similar to as described above, a gap and a metal strip or a combination thereof have the same functionality of preventing light from the filters located over the pixels in one line to be received by the pixels in an adjacent line. It is noted that no spacing exists between lines 206₁ and 206₂ and between lines 208₁ and 208₂ since the pixels in these lines are designated to receive the same spectral band.

Spectral measurement lines 208₁ and 208₂ are divided into a plurality of groups 212₁-212$_M$ of adjacent pixels. In the example depicted in FIG. 3, each group includes twelve spectral bands. Each one of groups 212₁-212$_M$ is associated with a respective group spectral range. In FIG. 3, the spectral band associated with each one of groups 212₁-212$_M$ is between 360 nm and 730 nm. In lines 208₁ and 208₂, each filter (e.g., a Fabry-Perot filter) is placed over an area of four pixels (i.e., two pixels in line 208₁ and two pixels in line 208₂). However, in FIG. 3, each filter (i.e., except for the boundary filters) covers two vertically adjacent pixels, the half of the two left vertically adjacent pixels and the half of the two right vertically adjacent pixels (i.e., these pixels are associated with the same pixel spectral band as defined by the filter). Furthermore, only every second pair of vertically adjacent pixels 214₁, 214₂, 214₃, . . . , 214$_N$ is read out. Accordingly, only pairs 214₁, 214₃, . . . , 214$_{N-1}$ of vertically adjacent pixels are read out while pairs 214₂, 214₄, . . . , 214$_N$ are employed as barriers preventing light from the filters located over, for example, pair 214₁ of vertically adjacent pixels to be received by pairs 214₃ of vertically adjacent pixels.

Similar to as described above, in general, within spectral measurement lines 208₁ and 208₂ each of multiples of vertically adjacent pixels 214₁, 214₂, 214₃, . . . , 214$_N$ are respectively associated with different respective spectral bands. The different respective spectral bands are non-identical to any one of the single spectral responses associated with each of the imaging spectral lines. In other words, at least two pairs of vertically adjacent pixels 214₁, 214₂, 214₃, . . . , 214$_N$ is each associated with a different respect spectral band. It is noted that pairs of vertically adjacent pixels are brought herein as an example only, according to the disclosed technique, triplets, quadruplets etc. may be similarly employed.

FIG. 3 depicts an exemplary implementation of the case where for each pixel line (e.g., a spectral measurement line), a filter is placed over at least three adjacent pixels such that the filter overlaps the at least three adjacent pixels, completely covering a middle at least one of said at least three adjacent pixels. Also only the pixels that are completely covered by the filter are read out. For example, the filter exhibiting response in the wavelengths between 400-470 nanometers overlaps with pairs vertically adjacent pixels 214₁, 214₂ and 214₃ (i.e., the respective pixel in each of spectral measurement lines 208₁ and 208₂) and completely covers pair of vertically adjacent pixels 214₂.

Figure 4:
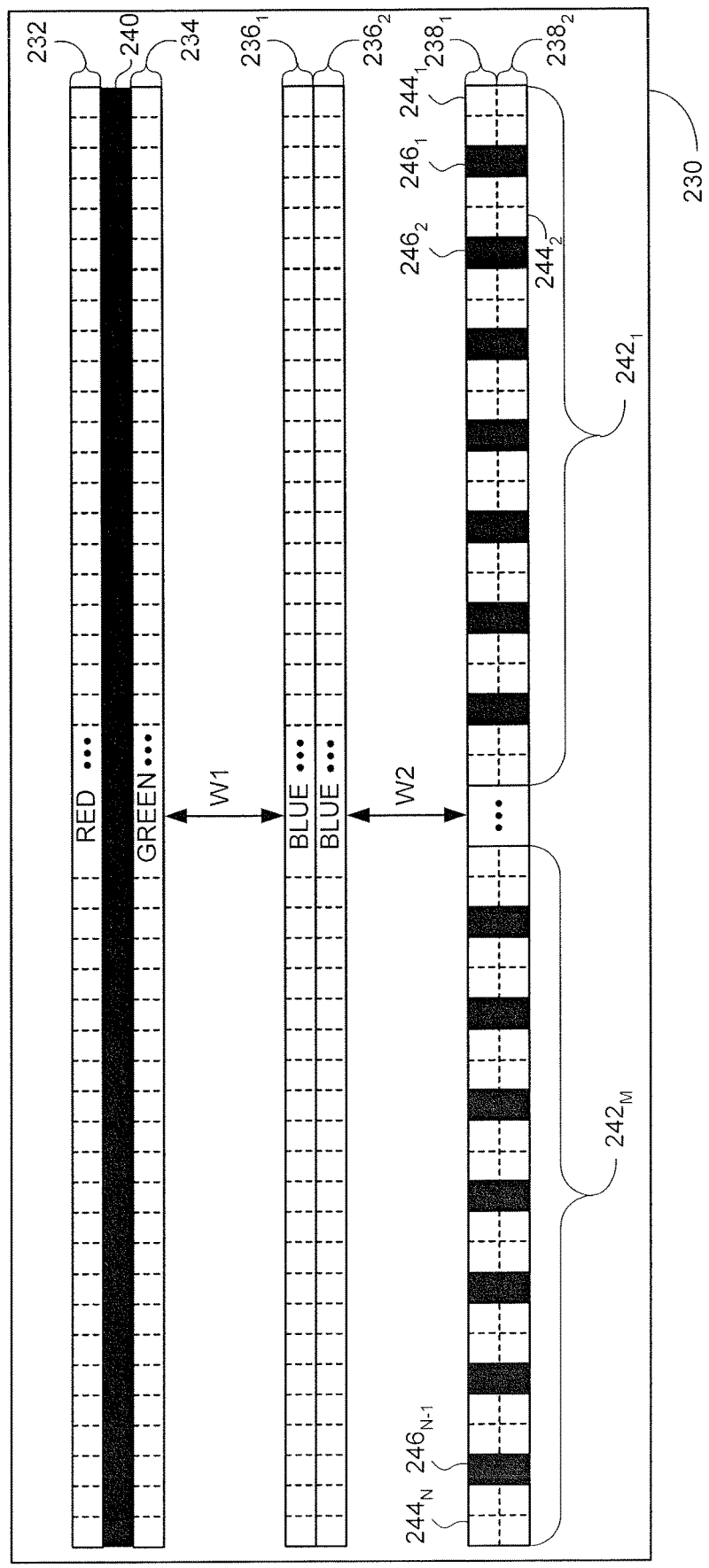
FIG. 4 is a schematic illustration of another exemplary combined spectral measurement and imaging line-scan sensor, constructed and operative in accordance with another embodiment of the disclosed technique.

Reference is now made to FIG. 4, which is a schematic illustration of another exemplary imaging and spectral measurement line-scan sensor, generally referenced 230, constructed and operative in accordance with another embodiment of the disclosed technique.

Line-scan sensor 230 is similar to line-scan sensor 200 however with differences described below. In sensor 230, Lines 232, 234, 236₁, 236₂ are imaging lines and lines 238₁ and 238₂ are spectral measurement lines. In FIG. 4, the dashed lines represent pixels. Each one of imaging lines 232, 234, 236₁, 236₂ is associated with a single respective line spectral band.

Line 232 is an imaging line associated with the red spectral band. Accordingly, each of the pixels in line 232 includes a respective filter (e.g., a red dichroic filter). Line 234 is an imaging line associated with the green spectral band. Accordingly, each of the pixels in line 234 includes a respective filter (e.g., a green dichroic filter). Lines 236₁ and 236₂ are imaging lines associated with the blue spectral band. As such, similar to lines 232 and 234, each of the pixels in lines 236₁ and 236₂ includes a respective filter (e.g., a blue dichroic filter). When employed for line scanning (similarly to as explained below in conjunction with FIG. 6), Time Delay Integration (TDI) may be employed with blue pixels in lines 236₁ and 236₂ thereby increasing the sensitivity of sensor 230 in the blue spectral band. Similar to as described above, two imaging lines associated with the blue spectral response are employed since, in general the, the pixels may exhibit a weaker response in the blue spectral than in the red and the green spectral bands or the lighting employed with the sensor may exhibit weaker emission in the blue spectral band than in the red and the green spectral bands.

Optionally, an opaque strip such as metal strip 240 is positioned between line 232 and 234. This metal strip prevents light from the filters located over the pixels in line 232 to be received by the pixels in line 234. Also optionally, a gap, 'W1', separates line 234 and line 236₁ and a gap, 'W2', separates line 236₂ and line 238₁. Similar to as described above, a gap and a metal strip or a combination thereof have the same functionality of preventing light from the filters located over the pixels in one line to be received by the pixels in an adjacent line. It is noted that no spacing exists between lines 236₁ and 236₂ and between lines 238₁ and 238₂ since the pixels in these lines are designated to receive the same spectral band.

Spectral measurement lines $238_1$ and $238_2$ are divided into a plurality of groups $242_1$-$242_M$ of adjacent pixels. In the example depicted in FIG. 4, each group includes eight spectral bands. Each one of groups $242_1$-$242_M$ is associated with a respective group spectral range. In lines $238_1$ and $238_2$, each filter (e.g., a Fabry-Perot filter), respective of each spectral band, is placed over an area of four pixels (i.e., two pixels in line $238_1$ and two pixels in line $238_2$). Each two adjacent groups of four pixels $244_1$-$244_N$ is separated by two vertically adjacent pixels $246_1$-$246_{N-1}$. Each of two vertically adjacent pixels $246_1$-$246_{N-1}$ is covered with an opaque material. This opaque material is employed as barriers preventing light from the filters located over, for example, group $244_1$ of four pixels to be received by group $244_2$. Thus, only groups $244_1$-$244_N$ are read out.

Similar to as described above, in general, within spectral measurement lines $238_1$ and $238_2$ at least a group of four pixels $244_1$, $244_2$, $244_3$, ..., $244_N$ and a second group of four pixels $244_1$, $244_2$, $244_3$, ..., $244_N$ are respectively associated with a first spectral band and a second spectral band. The first spectral band is different from the second spectral band. In other words, at least two groups of four pixels $244_1$, $244_2$, $244_3$, ..., $244_N$ is each associated with a different respect spectral band.

Figure 5:
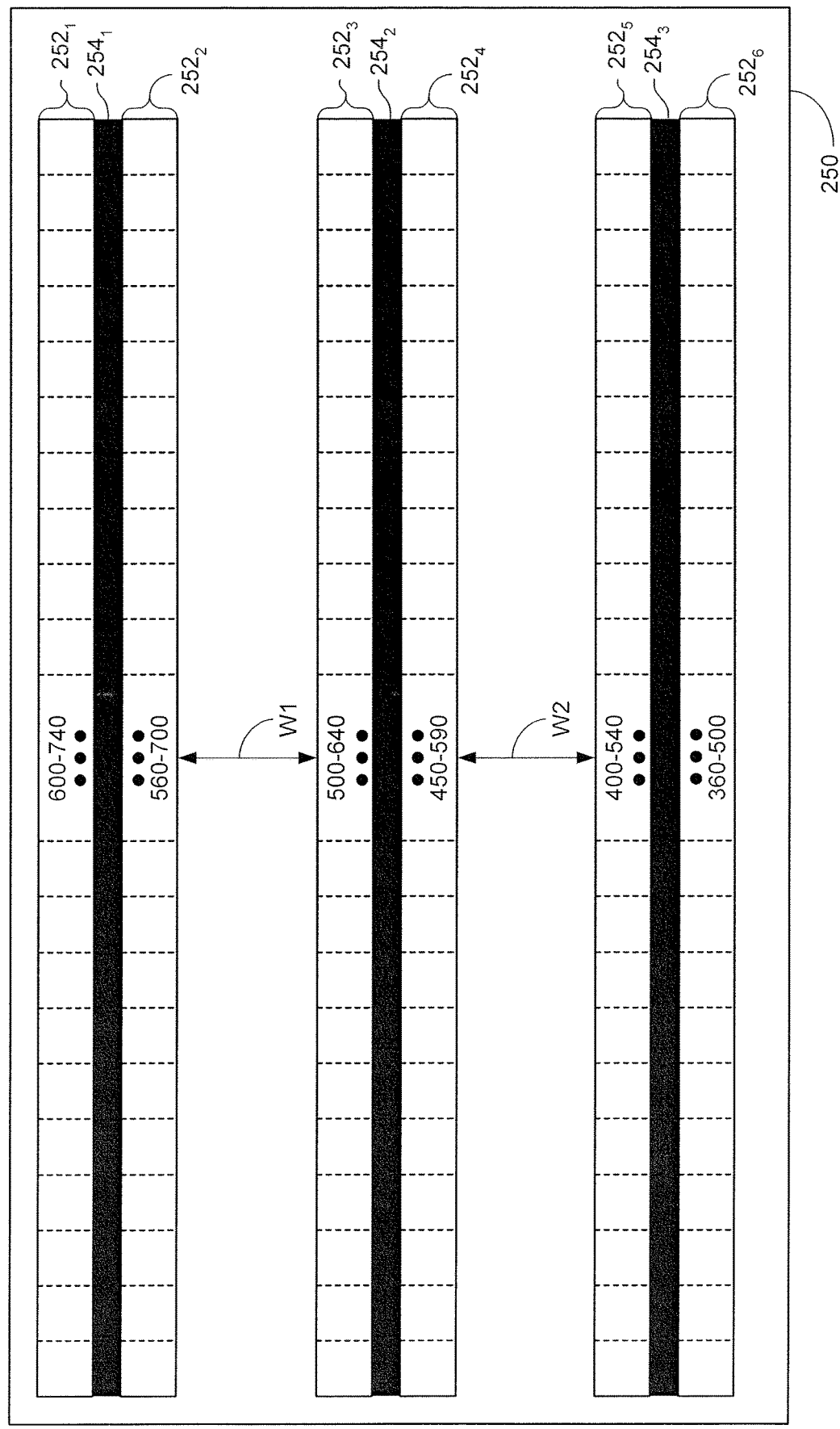
FIG. 5 is a schematic illustration of a further exemplary combined spectral measurement and imaging line-scan sensor constructed and operative in accordance with a further embodiment of the disclosed technique.

Reference is now made to FIG. 5, which is a schematic illustration of a further exemplary line-scan imaging sensor, generally referenced 250, constructed and operative in accordance with a further embodiment of the disclosed technique. Line scan sensor 250 includes six imaging lines $250_1$-$250_6$. Each one of imaging lines $250_1$-$250_6$ is associated with a single respective line spectral band. To that end, a filter exhibiting a response in the desired spectral band is placed over the line of pixels. In sensor 250, the spectral band associated with line $252_1$ is between 600 nm and 740 nm. The spectral band associated with line $252_2$ is between 500 nm and 640 nm. The spectral band associated with line $252_3$ is between 450 nm and 590 nm. The spectral band associated with line $252_4$ is between 450 nm and 590 nm. The spectral band associated with line $252_5$ is between 400 nm and 540 nm. The spectral band associated with line $252_6$ is between 360 nm and 500 nm.

Optionally, as depicted in FIG. 5, spacing exists between lines $252_1$-$252_6$. In FIG. 5, a gap, 'W1', separates line $252_2$ and line $252_3$ and a gap, 'W2' separates line $252_4$ and the $252_5$. Gap W1 prevents light from the filters located over the pixels in line $252_2$ to be received by the pixels in line $252_3$ and vice versa. Similarly, Gap W2 prevents light from the filters located over the pixels in line $252_4$ to be received by the pixels in line $252_5$ and vice versa. Also optionally, opaque strips such as metal strips $254_1$ $254_2$ and $254_3$ are positioned between line $252_1$ and $252_2$, between line $252_3$ and $252_4$, between line $252_5$ and $252_6$ respectively. Metal strip $254_1$ prevents light from the filters located over the pixels in line $252_1$ to be received by the pixels in line $252_2$ and vice versa. Metal strip $254_2$ prevents light from the filters located over the pixels in line $252_3$ to be received by the pixels in line $252_4$ and vice versa. Metal strip $254_3$ prevents light from the filters located over the pixels in line $252_5$ to be received by the pixels in line $252_6$ and vice versa.

Figure 6A:
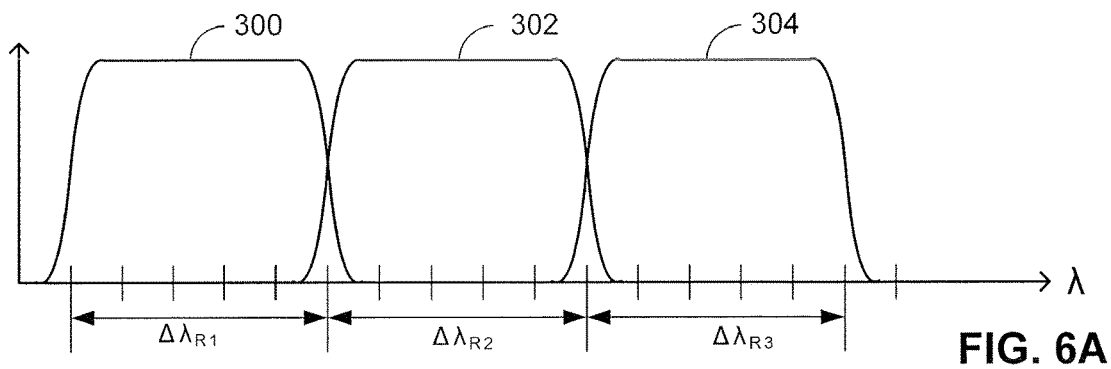
Figure 6B:
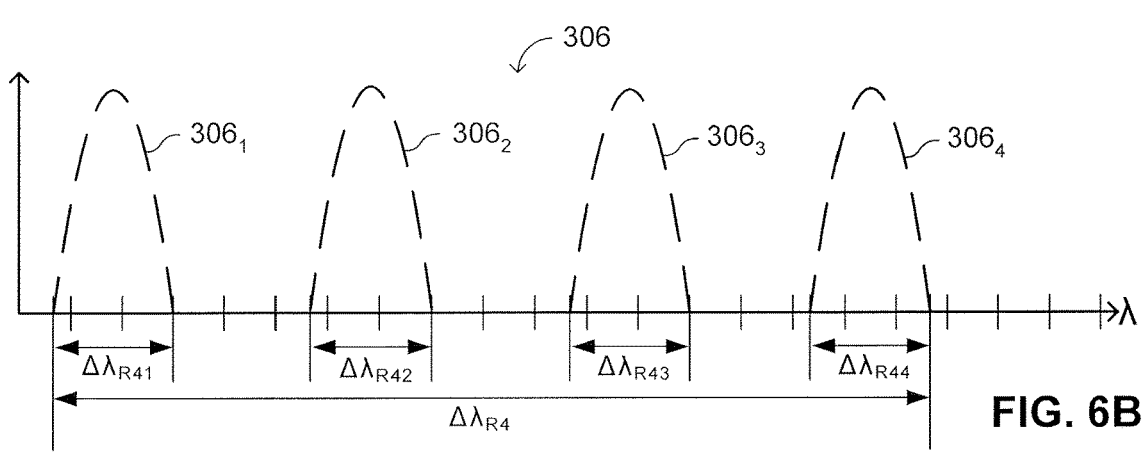

The arrangement of lines $252_1$-$252_6$, with respect to the line spectral bands thereof is brought herein as an example only. As another example the line spectral band associated with line $252_1$ is between 400 nm and 540 nm. The line spectral band associated with line $252_2$ is between 560 nm and 700 nm. The line spectral band associated with line $252_3$ is between 600 nm and 740 nm. The line spectral band associated with line $252_4$ is between 450 nm and 590 nm. The line spectral band associated with line $252_5$ is between 500 nm and 640 nm. The line spectral band associated with line $252_6$ is between 360 nm and 500 nm In general, the complexity, and consequently the cost of a combined imaging and spectral measurement line-scan sensor, increases with the number of different filters employed (i.e., with respect to spectral response to the filter). In other words, the complexity increases as the number different filters exhibiting a different spectral response increases. As such, it would be advantageous to decrease the number of filters employed in a given system. Reference is now made to FIGS. 6A-6F, which are schematic illustrations of exemplary spectral responses of filters, generally referenced 300, 302, 304, 306, 308 310 and 312, in accordance with another embodiment of the disclosed technique. In FIGS. 6A-6F, 'λ' represents wavelength. It is noted that spectral responses 306, 306, 308 310 and 312 are multi-peaked spectral responses and that each such multi-peaked spectral responses is associated with a single filter. In general, FIGS. 6A-6F depict the transmittance response of the filters. FIG. 6A depicts three spectral responses 300, 302 and 304, each corresponding to a respective filter, over a respective spectral range $\Delta\lambda_{R1}$, $\Delta\lambda_{R2}$ and $\Delta\lambda_{R3}$. For the purpose of explanation, filters exhibiting a spectral response such as spectral response 300, 302 and 304 shall be referred to herein as "wideband" filters. For example, spectral range $\Delta\lambda_{R1}$, $\Delta\lambda_{R2}$ and $\Delta\lambda_{R3}$ are in the visible range of the electromagnetic where $\Delta\lambda_{R1}$ corresponds to the blue range, $\Delta\lambda_{R2}$ corresponds to the green range and $\Delta\lambda_{R3}$ corresponds to the red range FIG. 6B depicts the spectral response 306 of a fourth filter. Spectral response 306 exhibits a multi-narrowband response over the spectral range $\Delta\lambda_{R4}$ and includes four spectral bands $306_1$, $306_2$, $306_3$ and $306_4$, each over respective one of spectral ranges $\Delta\lambda_{R41}$, $\Delta\lambda_{R42}$, $\Delta\lambda_{R43}$ and $\Delta\lambda_{R44}$. Spectral band $306_4$ is, for example, over the IR part of the spectrum.

Figure 6C:
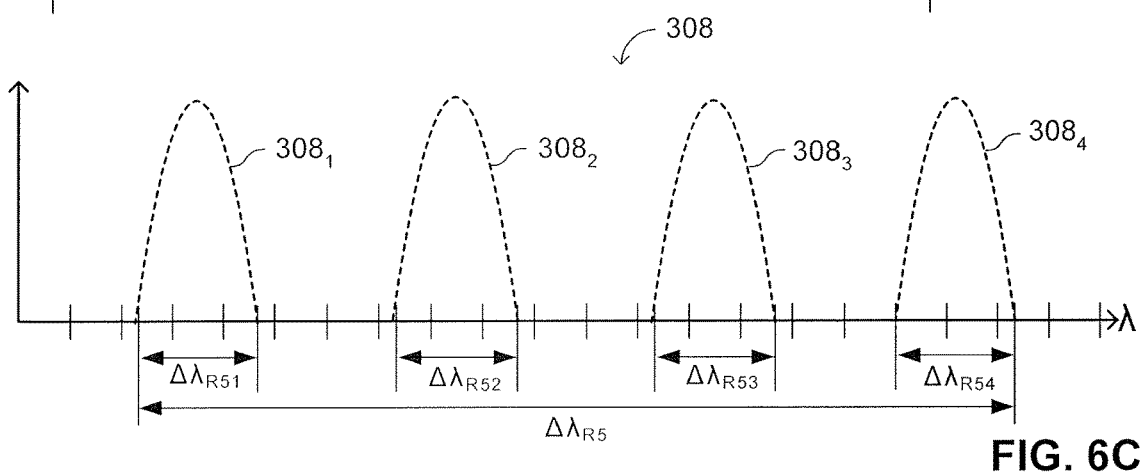

FIG. 6C depicts the spectral response 308 of a fifth filter. Spectral response 308 exhibits a multi-narrowband response over the spectral range ΔA % and includes four spectral bands $308_1$, $308_2$, $308_3$ and $308_4$, each over respective one of spectral ranges $\Delta\lambda_{R51}$, $\Delta\lambda_{R52}$, $\Delta\lambda_{R63}$ and $\Delta\lambda_{R54}$. Spectral band $308_4$ is, for example, over the IR part of the spectrum.

Figure 6D:
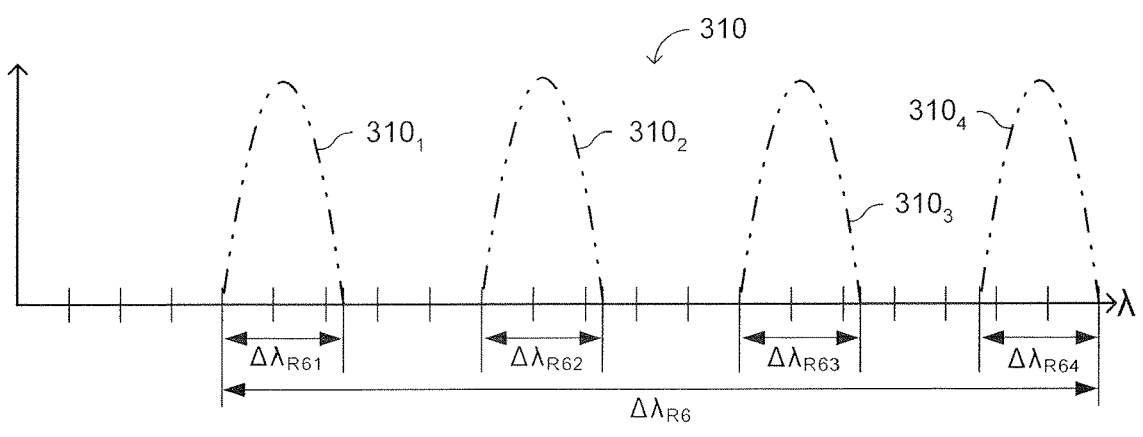

FIG. 6D depicts the spectral response 310 of a sixth filter. Spectral response 310 exhibits a multi-narrowband response and includes over the spectral range $\Delta\lambda_{R6}$ four spectral bands $310_1$, $310_2$, $310_3$ and $310_4$, each over respective one of spectral ranges $\Delta\lambda_{R61}$, $\Delta\lambda_{R62}$, $\Delta\lambda_{R63}$ and $\Delta\lambda_{R64}$. Spectral band $308_4$ is, for example, over the IR part of the spectrum.

For the purpose of explanation, and as mentioned above, filters exhibiting a spectral response such as spectral response 306, 308 and 310 shall be referred to herein as "multi-narrowband" filters. Also, the bandwidths, $\Delta\lambda_{R41}$, $\Delta\lambda_{R42}$, $\Delta\lambda_{R43}$ and $\Delta\lambda_{R44}$, of each spectral band $306_1$, $306_2$, $306_3$ and $306_4$, are smaller than the bandwidth $\Delta\lambda_{R4}$ of the spectral response 306 of the filter. Similarly, each of the bandwidths, $\Delta\lambda_{R51}$, $\Delta\lambda_{R52}$, $\Delta\lambda_{R63}$ and $\Delta\lambda_{R54}$, of each spectral band $308_1$, $308_2$, $308_3$ and $308_4$, are smaller than the bandwidth $\Delta\lambda_{R5}$ of the spectral response 310 of the filter, and the bandwidths, $\Delta\lambda_{R61}$, $\Delta\lambda_{R62}$, $\Delta\lambda_{R63}$ and $\Delta\lambda_{R64}$, of each spectral band $310_1$, $310_2$, $310_3$ and $310_4$, is smaller than the bandwidth $\Delta\lambda_{R6}$ of the spectral response 310 of the filter.

Figure 6F:
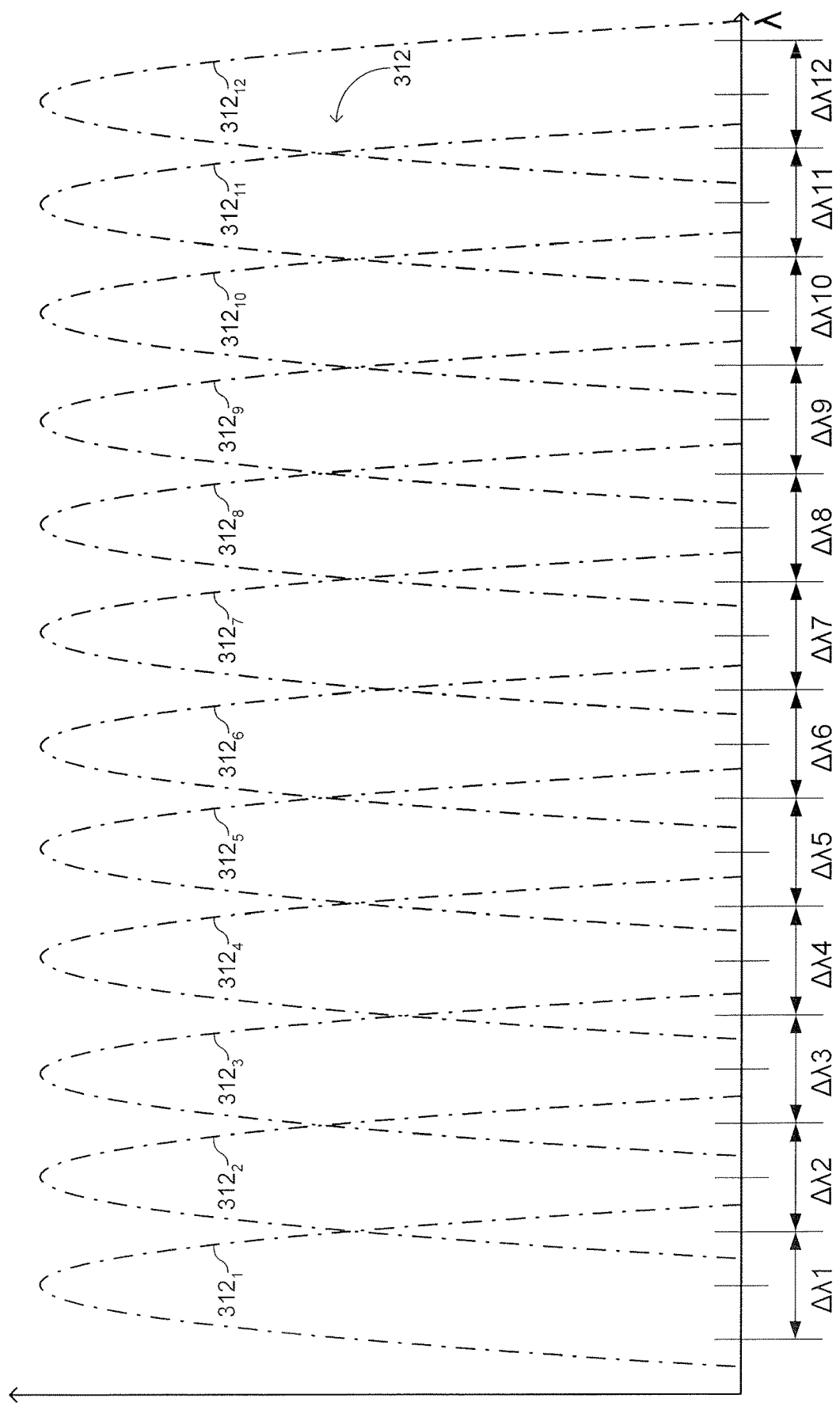

According to the embodiments of the disclosed technique described herein above in conjunction with FIGS. 6A-6E, and herein below in conjunction with FIGS. 7 and 8A-8D, a unique pixel spectral band is achieved by placing a "wideband" filter (e.g. exhibiting response 300—FIG. 6A) and a "multi-narrowband filter" (e.g. exhibiting response 306—FIG. 6B) one on top of the other, where the bandwidth of the wideband filter (e.g., $\Delta\lambda_{R1}$) spans a narrower wavelength range than that of the multi-narrowband filter (e.g., $\Delta\lambda_{R4}$) but is wider than the wavelength range spanned by each single band (e.g., $\Delta\lambda_{R41}$) within the multi-narrowband filter. Superimposing, a wideband filter (e.g., exhibiting spectral response 300), over a multi-narrowband filter (e.g., exhibiting for example spectral response 306), results in a composite filter exhibiting a spectral response, for example, of only $306_1$ over spectral range $\Delta\lambda_{R41}$. FIG. 6F depicts the spectral response 312 resulting from superimposing a selected one of filters exhibiting responses 300, 302 and 304 over a selected one of filters exhibiting responses 306, 308 and 310, respectively. Spectral response 312 exhibits a multi-band response including twelve spectral bands $312_1$, $312_2$, $312_3$, $312_4$, $312_5$, $312_6$, $312_7$, $312_8$, $312_9$, $312_{10}$, $312_{11}$ and $312_{12}$ (i.e., twelve channels), each over a respective spectral range $\Delta\lambda_1$, $\Delta\lambda_2$, $\Delta\lambda_3$, $\Delta\lambda_4$, $\Delta\lambda_5$, $\Delta\lambda_6$, $\Delta\lambda_7$, $\Delta\lambda_8$, $\Delta\lambda_9$, $\Delta\lambda_{10}$, $\Delta\lambda_{11}$ and $\Delta\lambda_{12}$. Thus twelve channels are achieved with only six filters.

Figure 7:
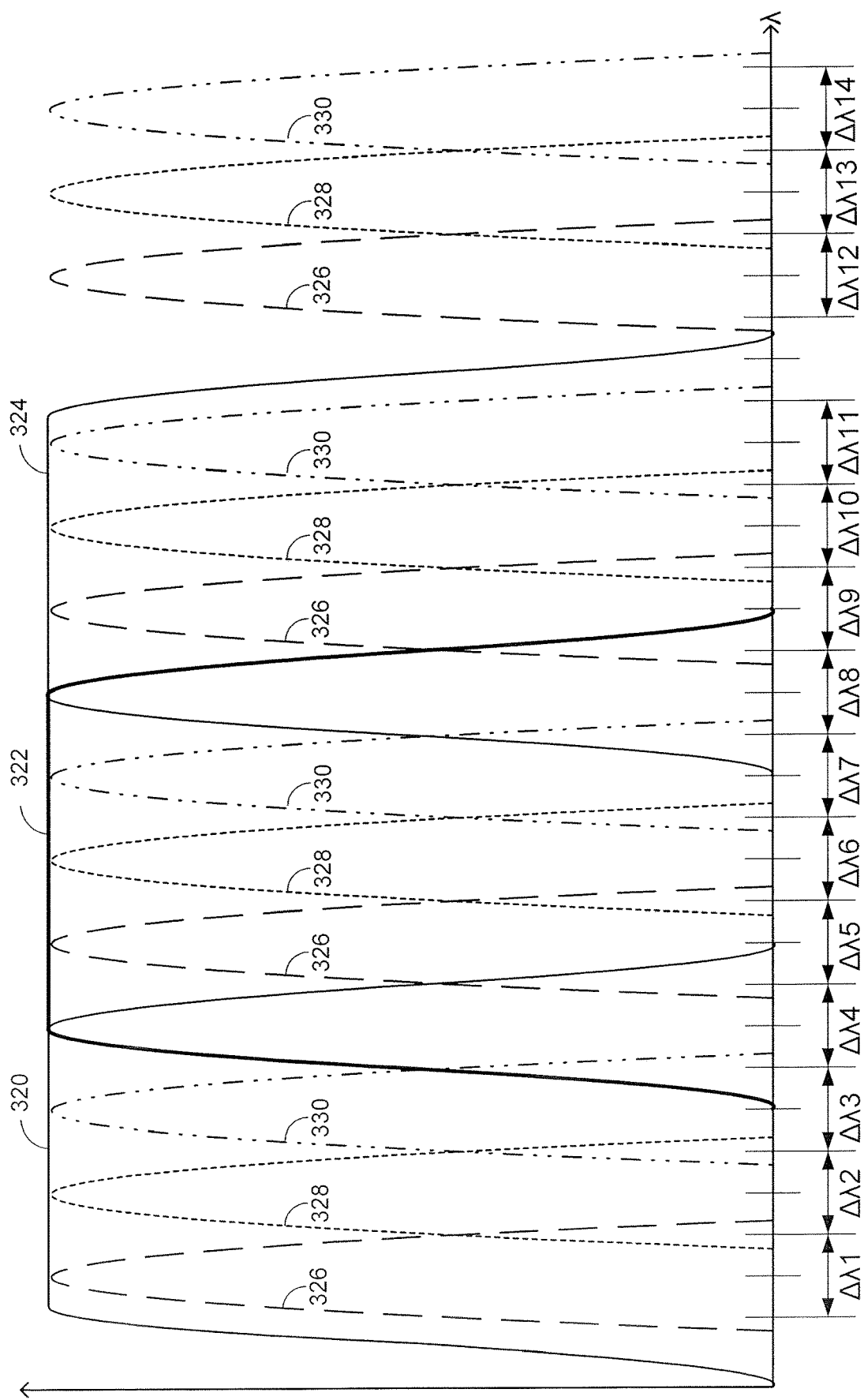
FIG. 7, which is a schematic illustration of exemplary spectral responses of filters in accordance with a further embodiment of the disclosed technique.

As mentioned above, according to one example, the filter exhibiting response 300, 302 and 304 are RGB filters, where the filter exhibiting response 300 is associated with the color blue (e.g., a blue dichroic filter), the filter exhibiting response 302 is associated with the color green (e.g., a green dichroic filter), the filter exhibiting response 304 is associated with the color red (e.g., a red dichroic filter). In general, such filters are commonly employed in color imaging sensors. As such, employing such filters, along with additional filters which exhibit responses similar to responses 306, 308 and 310 (FIGS. 6A, 6B and 6C respectively), results in spectral measurement sensor with a reduced number of filters. The number of filters may further be reduced by employing an overlap (i.e., either existing overlap or designed overlap) between the RGB filters. Reference is now made to FIG. 7, which is a schematic illustration of exemplary spectral responses of filters, generally referenced 320, 322, 324, 326, 328 and 330, in accordance with a further embodiment of the disclosed technique. FIG. 7 depicts the transmittance response of the filters. The overlap between spectral response 320 and spectral response 322 creates a spectral band over spectral range $\Delta\lambda 4$. The overlap between spectral response 322 and spectral response 324 over creates a spectral band over spectral range $\Delta\lambda 8$. The superposition of spectral response 320 and spectral response 326 creates a spectral band over spectral ranges $\Delta\lambda 1$. The superposition of spectral response 320 and spectral response 328 creates a spectral band over spectral ranges $\Delta\lambda 2$. The superposition of spectral response 320 and spectral response 330 creates a spectral band over spectral ranges $\Delta\lambda 3$. Similarly the superposition of spectral response 322 with spectral responses 326, 328 and 330 creates spectral bands over spectral ranges $\Delta\lambda 5$, $\Delta\lambda 6$ and $\Delta\lambda 7$ respectively and the superposition of spectral response 324 with spectral responses 326, 328 and 330 creates spectral bands over spectral ranges $\Delta\lambda 9$, $\Delta\lambda 10$ and $\Delta\lambda 11$ respectively. Spectral ranges $\Delta\lambda 1$-$\Delta\lambda 11$ are, for example, in the visible part of the spectrum and spectral ranges $\Delta\lambda 12$-$\Delta\lambda 14$ are in the IR part of the spectrum. In the example brought forth in FIG. 7, fourteen channels are achieved with only six filters.

The spectral responses depicted in FIGS. 6A-6D and 7 are for illustration purposes only. In general, the spectral responses of the filters should be designed according to design specifications and requirements. Such specification and requirements include, for example, overlapping of the transmittance spectral response between spectrally adjacent filters, the spectrum of the light illuminating the object, the inherent quantum efficiency (i.e., relative signal generated by light at each wavelength) of each pixel and the quantization resolution. An example of the effects of overlap of the transmittance spectral response between spectrally adjacent filters and quantization is brought forth herein below in conjunction with FIGS. 9A-9H.

Figure 8A:
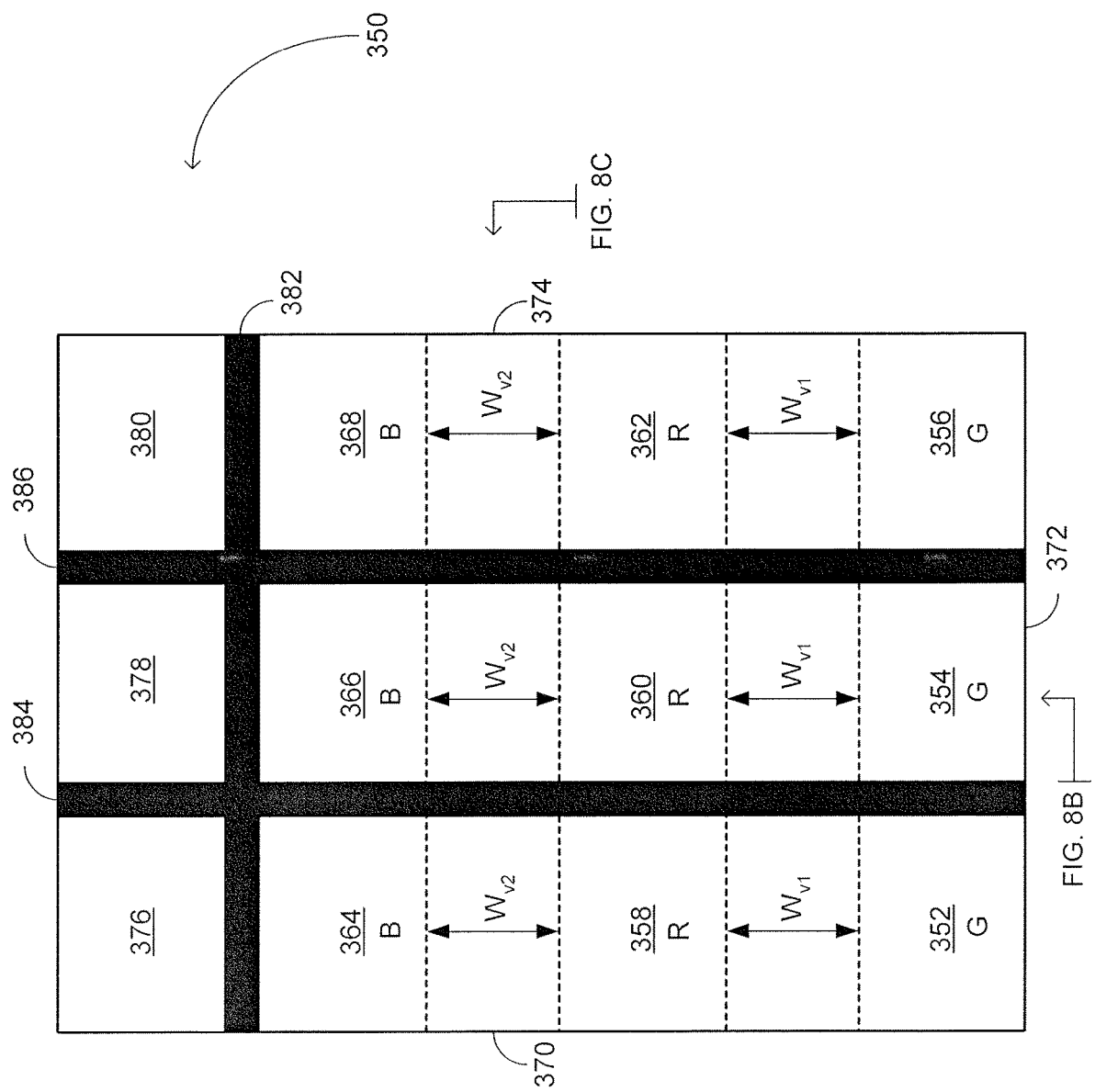
FIGS. 8A, 8B, 8C and 8D are schematic illustrations of an exemplary spectral measurement line-scan sensor constructed and operative in accordance with another embodiment of the disclosed technique.
Figure 8B:
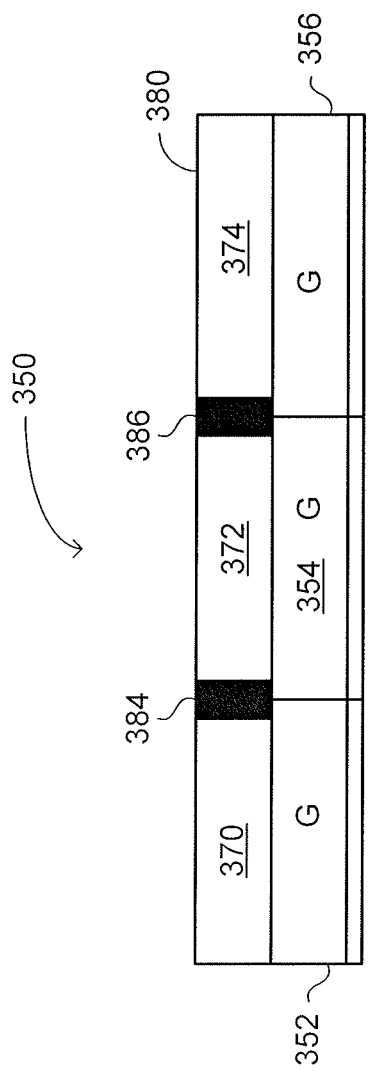
Figure 8C:
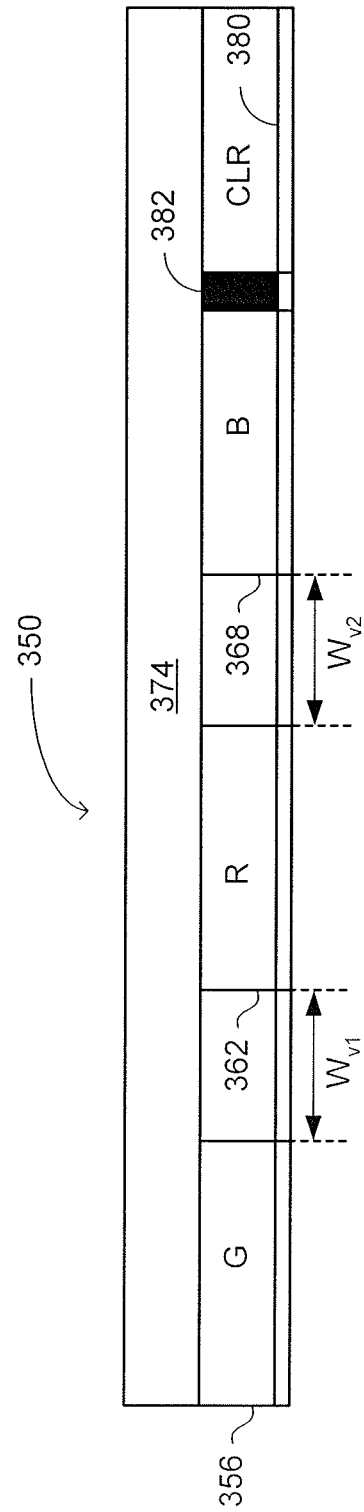
Figure 8D:
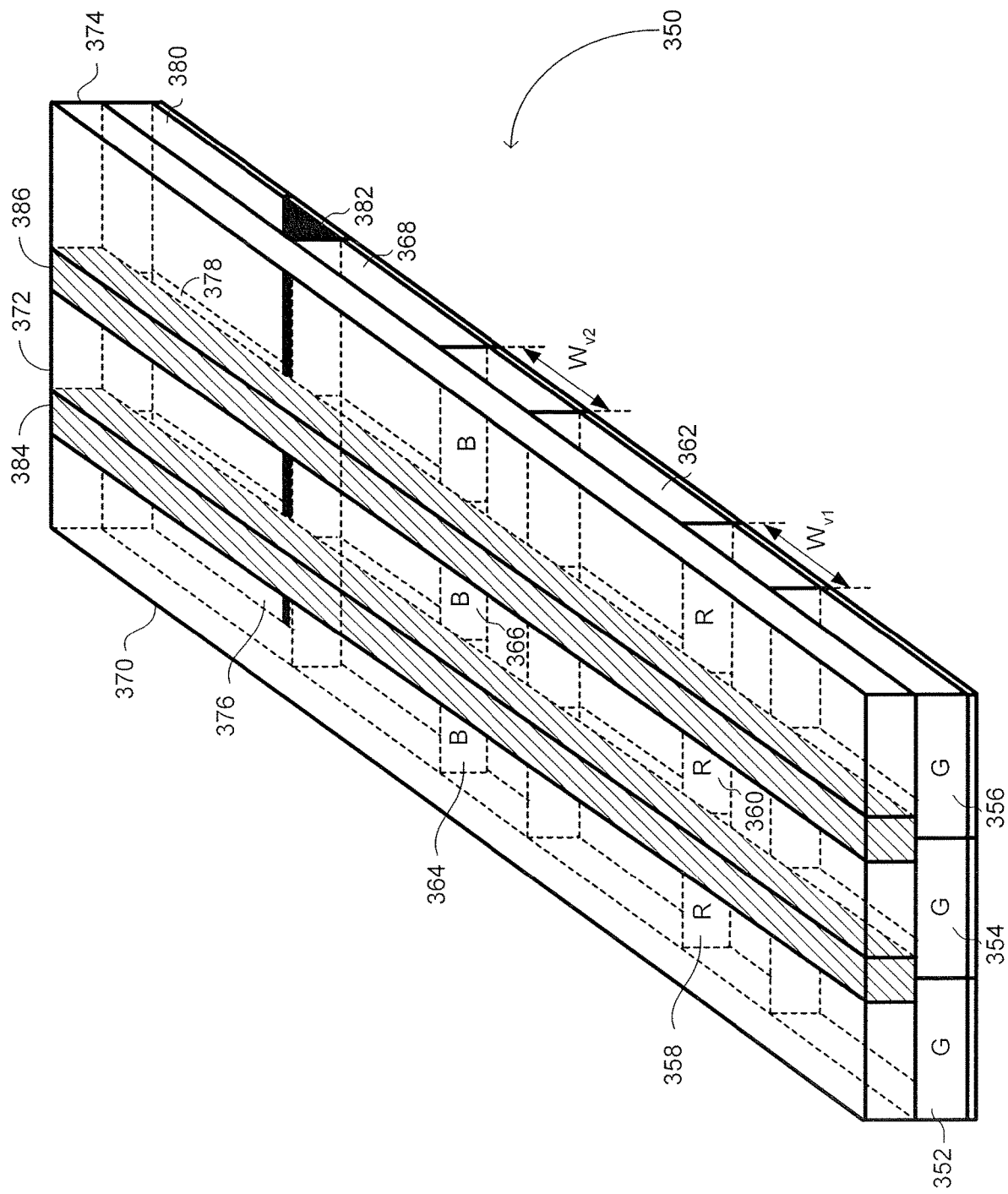

Reference is now made to FIGS. 8A, 8B, 8C and 8D, which are schematic illustrations of an exemplary combined imaging and spectral measurement sensor, generally referenced 350, constructed and operative in accordance with another embodiment of the disclosed technique. FIG. 8A depicts a top view of sensor 350, FIGS. 8B and 8C depict side view of sensor 350 and FIG. 8D is an isometric view of sensor 350. Spectral measurement line-scan sensor 350 includes three green filters 352, 354 and 356 demarked 'G' in FIGS. 8A-8D, three red filters 358, 360 and 362 demarked 'IR' in FIGS. 8A-8D and three blue filters 364, 366 and 368 demarked 'B' in FIGS. 8A-8D. Green filters 352, 354 and 356 exhibit a spectral response similar to spectral response 300 or spectral response 320. Red filters 358, 360 and 362 exhibit a spectral response similar to spectral response 302 or spectral response 322. Blue filters 364, 366 and 368 exhibit a spectral response similar to spectral response 304 or spectral response 324.

Filters 352, 354, 356, 358, 360, 364, 364, 366 and 368 are positioned over respective pixels (not shown) on sensor 350. A filter 370 is placed over green filter 352, red filter 358, blue filter 364 and over pixel 376 (i.e., the space between pixel 376 and filter 370 is clear). Filter 370 exhibits, for example a spectral response similar to spectral response 306 (FIG. 6B). A filter 372 is placed over green filter 354, red filter 360, blue filter 366 and over pixel 378 (i.e., the space between pixel 378 and filter 372 is clear). Filter 372 exhibits, for example a spectral response similar to spectral response 308 (FIG. 6C). A filter 374 is placed over green filter 356, red filter 362 and blue filter 368 and over pixel 380 (i.e., the space between pixel 380 and filter 374 is clear demarked 'CLR' in FIG. 8B). Filter 374 exhibits, for example a spectral response similar to spectral response 310 (FIG. 6D).

A metal strip 382 is placed between the pixels corresponding to filters 364, 366 and 368 and pixels 376, 378 and 380. An opaque section 384 is placed between filter 370 and filter 372 and an opaque section 386 is placed between filter 372 and filter 374. A gap $W_{v1}$ exists between green filter 352 and red filter 358, between green filter 354 and red filter 360, between green filter 356 and red filter 362. A gap $W_{v2}$ exists between red filter 358 and blue filter 364, between red filter 360 and red blue 366 and between red filter 362 and blue filter 368. Similar to as mentioned above gaps $W_{v1}$ and $W_{v2}$ prevents light received by one pixel to be received by an adjacent pixel. Also similar to as mentioned above, either one of gaps $W_{v1}$ and $W_{v2}$ may be replaced with a metal strip or an opaque material suitable to be fabricated on a substrate of a sensor such as sensor 350. In the example brought forth above in FIGS. 6A-6D above, nine channels are achieved with only six filters. This reduced number of filters enables easier placement of filters, such as filters 370, 372 and 374 (FIGS. 8A-8D) since these filters are larger in size (i.e., relative to a filter placed over a single pixel), allowing for larger placement tolerances. Furthermore, the larger size optionally enables passive placement of filters 370, 372 and 374.

Sensor 350 may be employed, for example, for acquiring spectral measurements in the visible spectral band as well as in the IR band. With reference to FIGS. 6A-6E, pixel 376 receives energy over spectral ranges $\Delta\lambda_{R41}$, $\Delta\lambda_{R42}$, $\Delta\lambda_{R43}$ and $\Delta\lambda_{R44}$. In the example brought forth, spectral ranges $\Delta\lambda_{R41}$, $\Delta\lambda_{R42}$, $\Delta\lambda_{R43}$ are in the visible spectral band and spectral range $\Delta\lambda_{R44}$ is in the IR band. The pixel corresponding to filter 352 receives energy in over spectral range $\Delta\lambda_{R41}$ (i.e., filter 352 filters out spectral ranges $\Delta\lambda_{R42}$, $\Delta\lambda_{R43}$ and $\Delta\lambda_{R44}$). The pixel corresponding to filter 358 receives energy in over spectral range $\Delta\lambda_{R42}$ (i.e., filter 358 filters out spectral ranges $\Delta\lambda_{R41}$, $\Delta\lambda_{R43}$ and $\Delta\lambda_{R44}$). The pixel corresponding to filter 364 receives energy in over spectral range $\Delta\lambda_{R43}$ (i.e., filter 364 filters out spectral ranges $\Delta\lambda_{R41}$, $\Delta\lambda_{R42}$ and $\Delta\lambda_{R44}$). The energy received over spectral range $\Delta\lambda_{R44}$ is a function of the energy received by each of the pixels corresponding to filters 352, 358 and 364 and the energy received by pixel 376.

Similarly, pixel 378 receives energy over spectral ranges $\Delta\lambda_{R51}$, $\Delta\lambda_{R52}$, $\Delta\lambda_{R53}$ and $\Delta\lambda_{R54}$. Spectral ranges $\Delta\lambda_{R51}$, $\Delta\lambda_{R52}$, $\Delta\lambda_{R53}$ are in the visible spectral band and spectral range $\Delta\lambda_{R54}$ is in the IR band. The pixel corresponding to filter 354 receives energy in the spectral range $\Delta\lambda_{R51}$ (i.e., filter 354 filters out spectral ranges $\Delta\lambda_{R52}$, $\Delta\lambda_{R53}$ and $\Delta\lambda_{R54}$). The pixel corresponding to filter 360 receives energy in spectral range $\Delta\lambda_{R52}$ (i.e., filter 360 filters out spectral ranges $\Delta\lambda_{R51}$, $\Delta\lambda_{R53}$ and $\Delta\lambda_{R54}$). The pixel corresponding to filter 366 receives energy in spectral range $\Delta\lambda_{R53}$ (i.e., filter 366 filters out spectral ranges $\Delta\lambda_{R51}$, $\Delta\lambda_{R52}$ and $\Delta\lambda_{R54}$). The energy received over spectral range $\Delta\lambda_{R54}$ is a function of the energy received by each of the pixels corresponding to filters 354, 360 and 366 and the energy received by pixel 378.

Further similarly, pixel 380 receives energy over spectral ranges $\Delta\lambda_{R61}$, $\Delta\lambda_{R62}$, $\Delta\lambda_{R63}$ and $\Delta\lambda_{R64}$. Spectral ranges $\Delta\lambda_{R61}$, $\Delta\lambda_{R62}$, $\Delta\lambda_{R63}$ are in the visible spectral band and spectral range $\Delta\lambda_{R64}$ is in the IR band. The pixel corresponding to filter 356 receives energy in spectral range $\Delta\lambda_{R61}$ (i.e., filter 356 filters out spectral ranges $\Delta\lambda_{R62}$, $\Delta\lambda_{R63}$ and $\Delta\lambda_{R64}$). The pixel corresponding to filter 362 receives energy in over spectral range $\Delta\lambda_{R62}$ (i.e., filter 362 filters out spectral ranges $\Delta\lambda_{R61}$, $\Delta\lambda_{R63}$ and $\Delta\lambda_{R64}$). The pixel corresponding to filter 368 receives energy in spectral range $\Delta\lambda_{R63}$ (i.e., filter 368 filters out spectral ranges $\Delta\lambda_{R61}$, $\Delta\lambda_{R62}$ and $\Delta\lambda_{R64}$). The energy received over spectral range $\Delta\lambda_{R64}$ is determined as a function of the energy received by each of the pixels corresponding to filters 356, 362 and 368 and the energy the received by pixel 380. Thus sensor 350 acquires an image over all of spectral ranges $\Delta\lambda_1$, $\Delta\lambda_2$, $\Delta\lambda_3$, $\Delta\lambda_4$, $\Delta\lambda_5$, $\Delta\lambda_6$, $\Delta\lambda_7$, $\Delta\lambda_8$, $\Delta\lambda_9$, $\Delta\lambda_{10}$, $\Delta\lambda_{11}$ and $\Delta\lambda_{12}$.

As mentioned above, the spectral responses of the filters should be designed according to design specifications and requirements. Such specification and requirements include, for example, overlapping of the transmittance spectral response between spectrally adjacent filters, the spectrum of the light illuminating the object, the inherent quantum efficiency (i.e., relative signal generated by light at each wavelength) of each pixel and the quantization resolution. Reference is now made to FIGS. 9A-9H, which are a schematic illustration of an example of the effects of overlap of the spectral sensitivity curves associated with spectrally adjacent filters as well as the effects of quantization, in accordance with a further embodiment of the disclosed technique. In FIGS. 9A-9H, the horizontal axis relates to wavelength (abbreviated λ in FIGS. 9A-9H) and the vertical axes relates to reflectance values. In the example brought forth in FIGS. 9A-9H the wavelengths are measured between 1-10 and reflectance is measured between 0 and 1. Also in the example depicted in FIGS. 9A-9H, three channels (i.e., filters) are employed for spectral measurement. It is however, noted that spectral measurement systems may employ up to 31 channels and more. Depicted in FIGS. 9A-9H are two graphs, 400 and 404 each of a respective reflectance curve 402 and 406 of light to be measured. Reflectance curves 402 exhibits a rectangular shape with the reflectance values of 1 between the wavelengths 4.5-9. Reflectance curve 406 exhibits the reflectance value of 0.5 between the wavelength 3 and 6 and the reflectance value of 1 between the wavelengths 6 and 9. Reflectance curves 402 and 406 represent, for example, the reflectance values of light (e.g., resulting from illumination of the object), which first impinges on an object and then is reflected therefrom.

With reference to FIGS. 9C and 9D, FIG. 9C depicts spectral sensitivity curves $410_1$, $410_2$ and $410_3$ and FIG. 9D depicts spectral sensitivity curves $412_1$, $412_2$ and $412_3$ respective of three filters. The term "spectral sensitivity curve" relates herein to a curve representing a function of the filter transmittance, the illumination, and quantum efficiency of the pixel collectively. Spectral sensitivity curves $410_1$, $410_2$ and $410_3$ do not overlap with each other. Spectral sensitivity curves $412_1$, $412_2$ and $412_3$ also do not overlap with each other. Spectral sensitivity curve $410_1$, $410_2$, $410_3$, $412_1$, $412_2$ and $412_3$ exhibit a value of 1. Spectral sensitivity curve $410_3$ is between wavelength 6.5 and 7.5 (i.e., completely within the reflectance curve 404). Spectral sensitivity curve $410_2$ is between wavelength 4 and 5 (i.e., Half of spectral sensitivity curve $410_2$ overlaps with reflectance curve 404). Spectral sensitivity curve $410_1$ is between wavelength 1.5 and 2.5 (i.e., mutually exclusive with reflectance curve 404). In general, the value generated by each pixel covered with a filter is proportional to the area under the spectral sensitivity curve of the filter. Therefore, the values generated by pixels covered with filters exhibiting sensitivity curves such as sensitivity curves $410_1$, $410_2$ and $410_3$ and receiving light exhibiting reflectance curve 404 are [0.00, 0.50, 1.00].

Spectral sensitivity curve $412_3$ is between wavelength 6.5 and 7.5, spectral sensitivity curve $410_2$ is between wavelength 4 and 5 and spectral sensitivity curve $412_1$ is between wavelength 1.5 and 2.5 (i.e., mutually exclusive with reflectance curve 406). However, since the value of reflectance curve 406 between wavelengths 4 and 5 is 0.5, the value of the reflectance curve 406, as would be determined by a filter exhibiting spectral sensitivity curve $412_2$ would have been 0.5. Therefore, the values generated by pixels covered with filters exhibiting sensitivity curves such as sensitivity curves $412_1$, $412_2$ and $412_3$ and receiving light exhibiting reflectance curve 406 are also [0.00, 0.50, 1.00]. Employing a 4-bit quantization analog to digital conversion both system results in quantized values of [0, 8, 15] representing reflectance curve 404 as well as reflectance curve 406. Thus, it would have been impossible to discern between reflectance curve 404 and reflectance curve 406 when employing filters which exhibit non-overlapping spectral sensitivity curves.

Figure 9B:
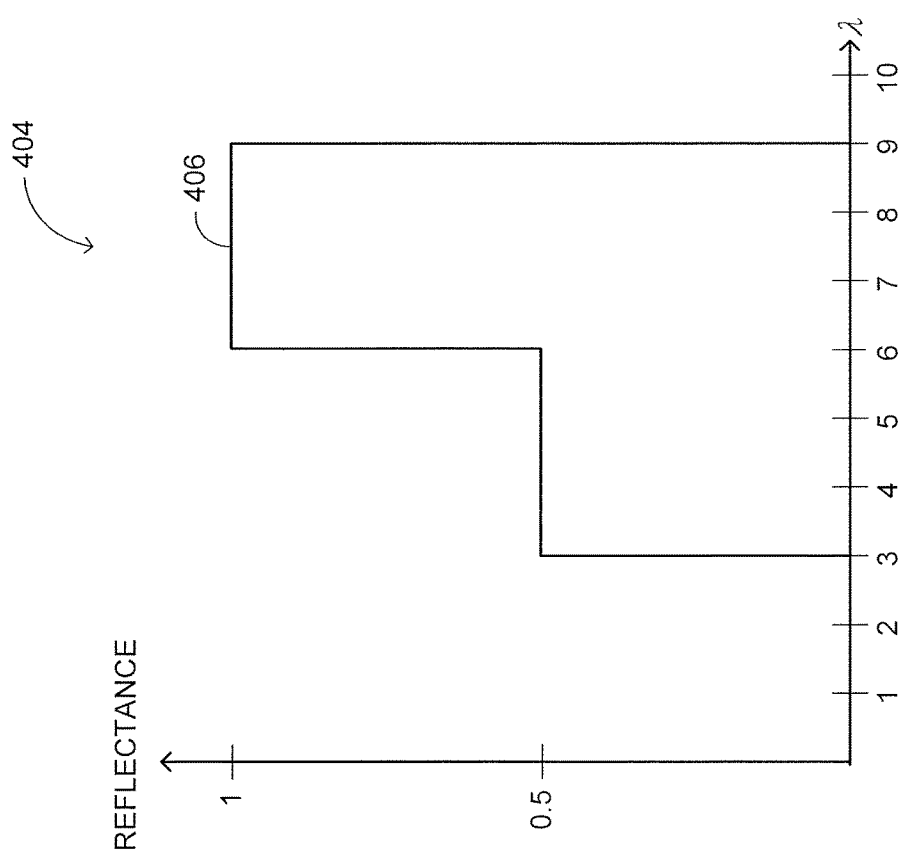
Figure 9A:
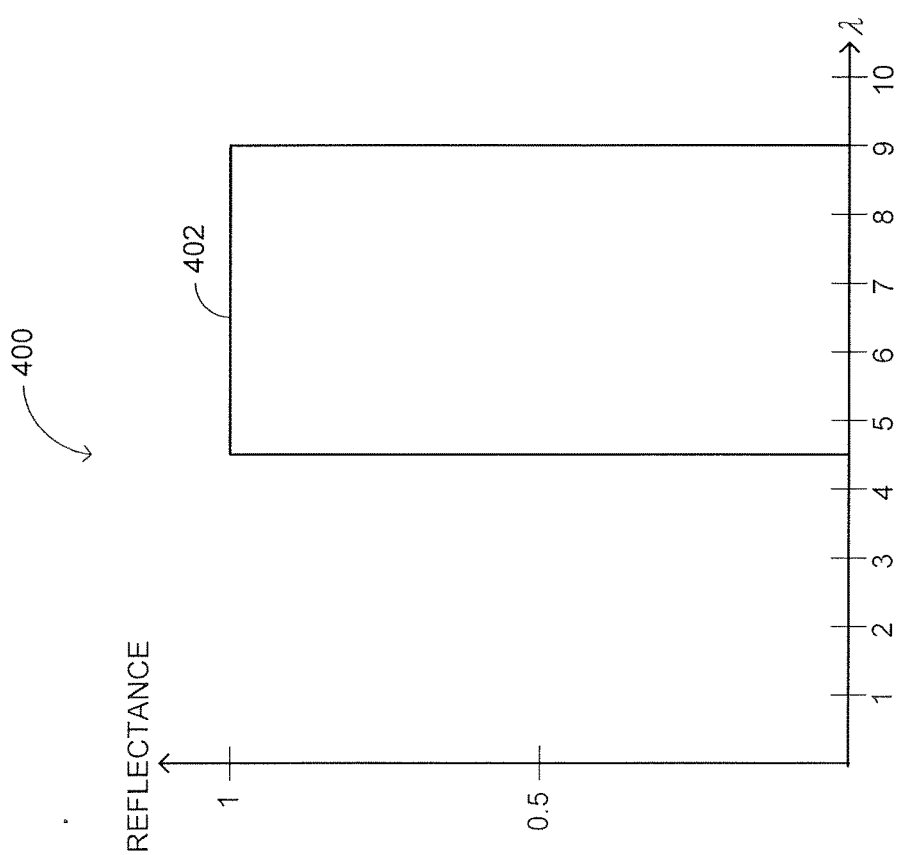
Figure 9F:
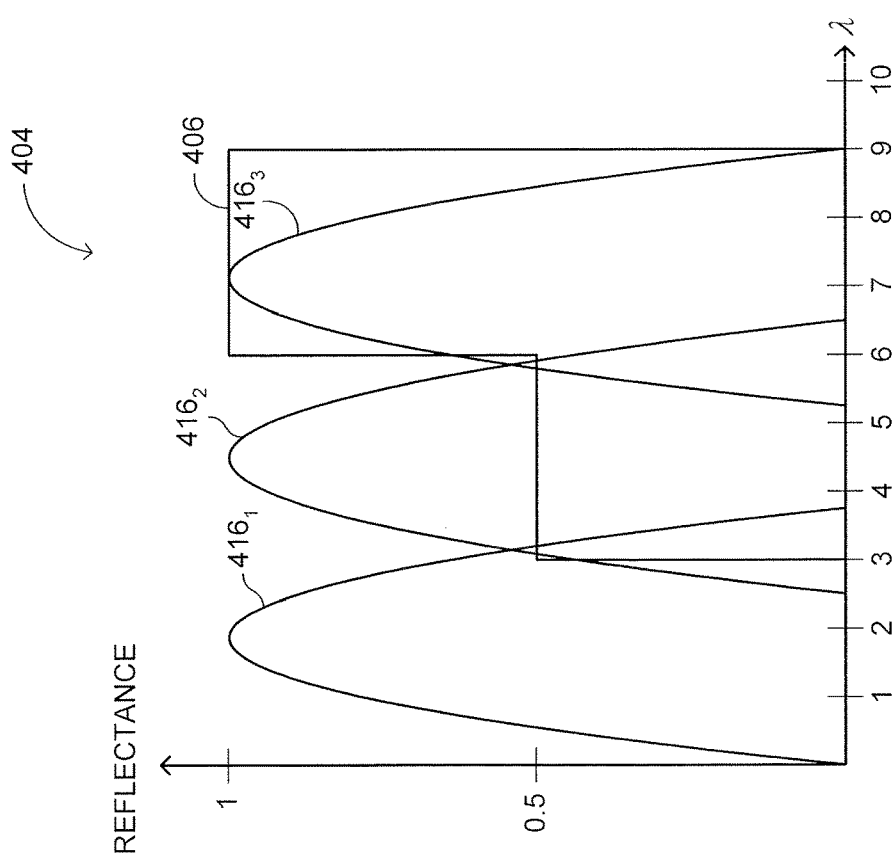
Figure 9E:
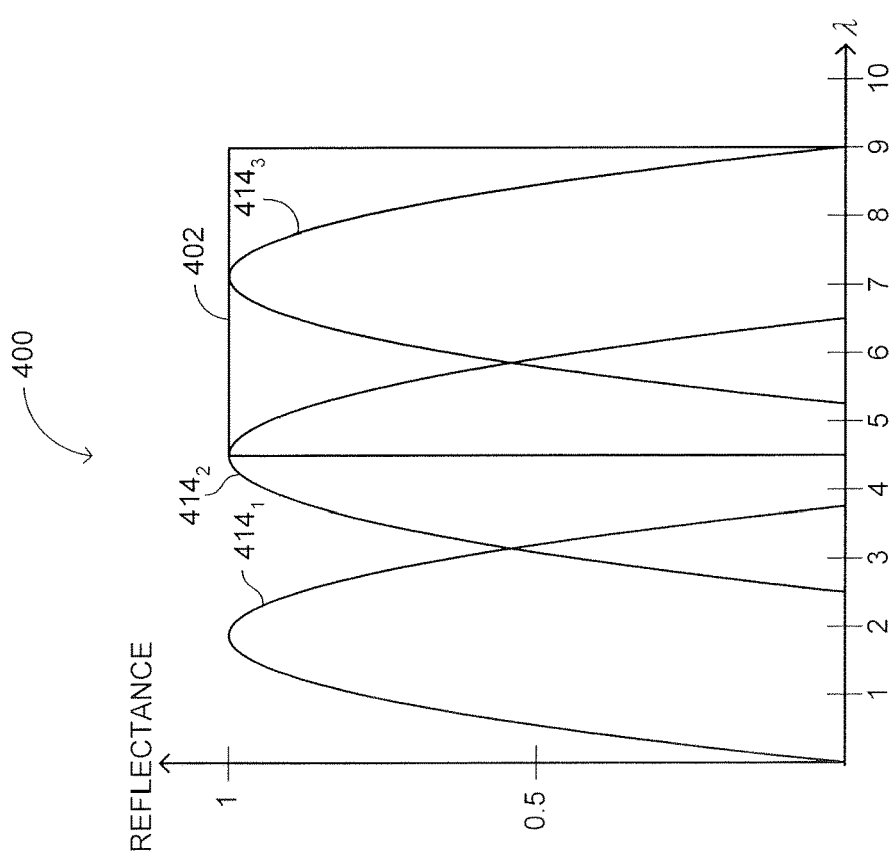

With reference to FIGS. 9E and 9F, FIG. 9E depicts spectral sensitivity curves $414_1$, $414_2$ and $414_3$ and FIG. 9D depicts spectral sensitivity curves $416_1$, $416_2$ and $416_3$ respective of three filters. Spectral sensitivity curve $414_2$ overlaps with each of spectral sensitivity curves $414_1$ and $414_3$. Spectral sensitivity curves $414_1$ and $414_2$ cross at the Full Width Half Maximum (FWHM) points of the sensitivity curve curves. Spectral sensitivity curves $414_2$ and $414_3$ also cross at the FWHM points of the sensitivity curve curves. Similarly, spectral sensitivity curve $416_2$ overlaps with each of spectral sensitivity curves $416_1$ and $416_3$. Spectral sensitivity curves $416_1$ and $416_2$ cross at the FWHM points of the sensitivity curve curves. Spectral sensitivity curves $416_2$ and $416_3$ also cross at the FWHM points of the sensitivity curve curves.

The values generated by pixels covered with filters exhibiting sensitivity curves such as sensitivity curves $414_1$, $414_2$ and $414_3$ and receiving light exhibiting reflectance curve 404 are [0.00, 0.50, 1.00]. As above, employing 4-bit quantization analog to digital conversion will result in quantized values of [0, 8, 15] representing reflectance curve 404. However, the values generated by pixels covered with filters exhibiting sensitivity curves such as sensitivity curves $416_1$, $416_2$ and $416_3$ and receiving light exhibiting reflectance curve 406 are [0.1, 0.40, 0.9] representing reflectance curve 406. Employing 4-bit quantization analog to digital conversion will result in quantized values of [2, 6, 15]. The differences between the quantized pixel values of reflectance curve 404 and reflectance curve 406 is enough to sufficiently discern therebetween even is with an increase in the system noise.

Figure 9H:
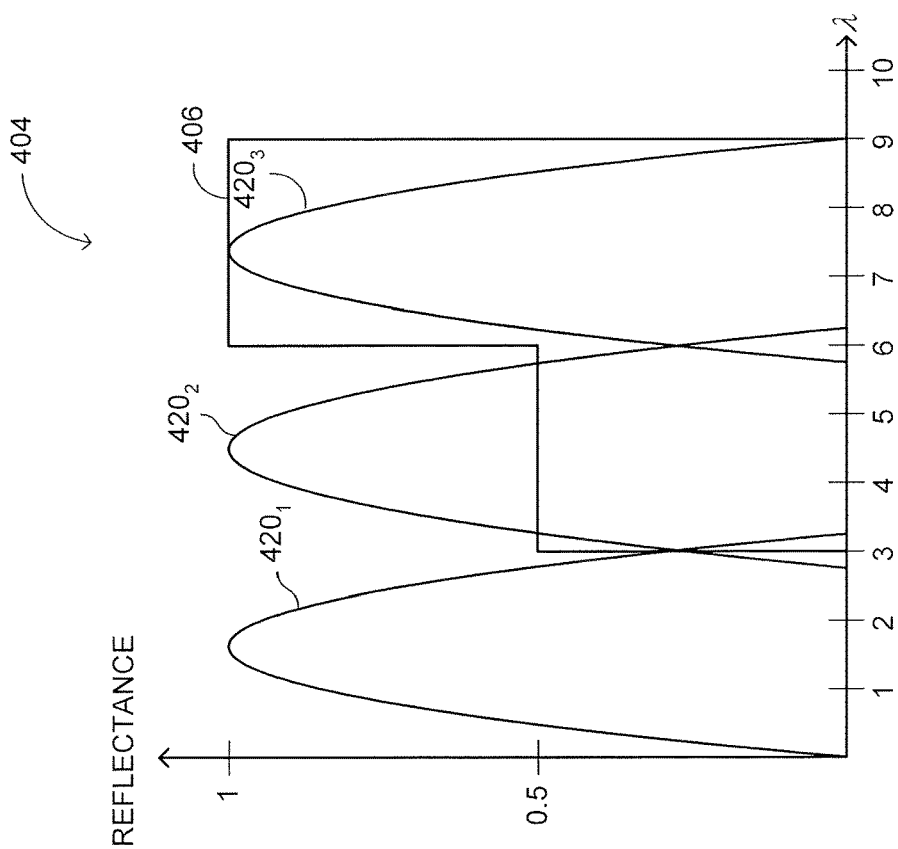
Figure 9G:
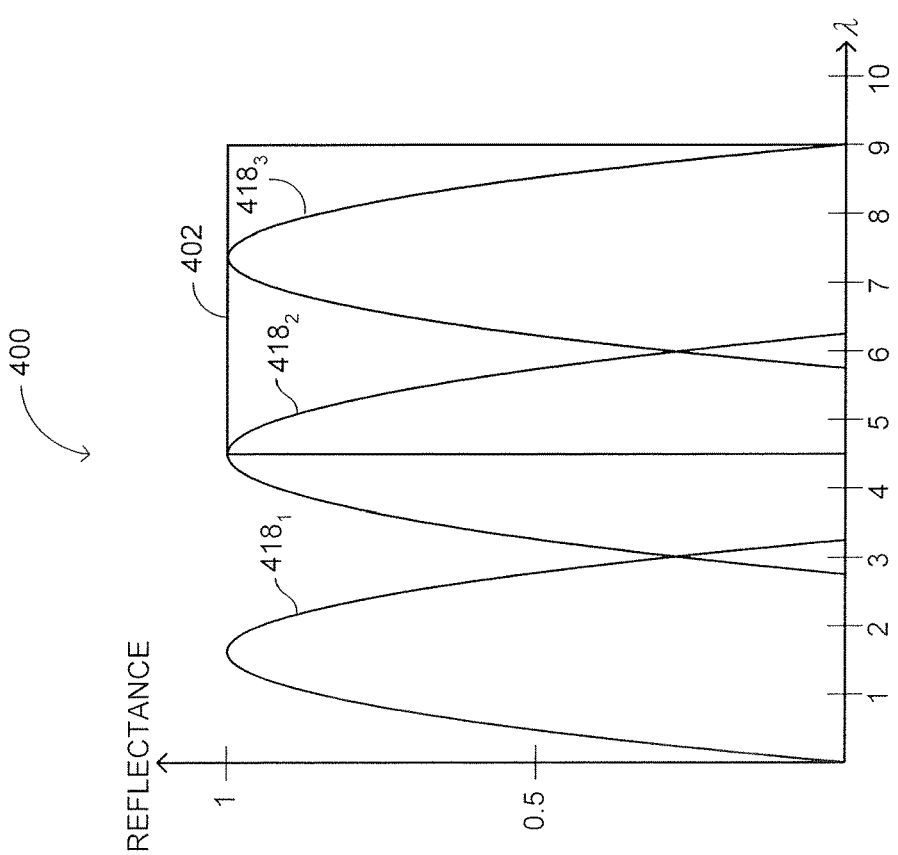

With reference to FIGS. 9G and 9H, FIG. 9E depicts spectral sensitivity curves $418_1$, $418_2$ and $418_3$ and FIG. 9G depicts spectral sensitivity curves $420_1$, $420_2$ and $420_3$ respective of three filters. Spectral sensitivity curve $418_2$ overlaps with each of spectral sensitivity curves $418_1$ and $418_3$. Spectral sensitivity curves $418_1$ and $418_2$ cross at point lower than the FWHM point. Spectral sensitivity curves $418_2$ and $418_3$ also cross at point lower than the FWHM point. Similarly, spectral sensitivity curve $420_2$ overlaps with each of spectral sensitivity curves $420_1$ and $420_3$. Spectral sensitivity curves $420_1$ and $420_2$ cross at points lower than the FWHM points of the sensitivity curve curves. Spectral sensitivity curves $420_2$ and $420_3$ also cross at points lower than the FWHM points of the sensitivity curve curves.

The values generated by pixels covered with filters exhibiting sensitivity curves such as sensitivity curves $418_1$, $418_2$ and $418_3$ and receiving light exhibiting reflectance curve 404 are [0.00, 0.50, 1.00]. As above, employing 4-bit quantization analog to digital conversion will result in quantized values of [0, 8, 15] representing reflectance curve 404. However, the values generated by pixels covered with filters exhibiting sensitivity curves such as sensitivity curves $420_1$, $420_2$ and $420_3$ and receiving light exhibiting reflectance curve 406 are [0.01, 0.45, 1.0] representing reflectance curve 406. Employing 4-bit quantization analog to digital conversion will result in quantized values of [0, 7, 16]. Although the differences between the quantized pixel values of reflectance curve 404 and reflectance curve 406 is enough to sufficiently discern therebetween any increase in noise may render these two curves indiscernible. Increasing the quantization resolution (e.g., 8-bit, 12-bit etc.) shall result in a larger difference between the quantized values of reflectance curves 404 and reflectance curve 406.

The description hereinabove in conjunction with FIGS. 9A-9H exemplified the tradeoff between the overlap between overlap of filter spectral sensitivity curves and quantization resolution, as well robustness to noise. Such tradeoffs and affects should be considered during the design of a color measurement system. Nonetheless, the design of overlapping filters results in better spectral coverage (i.e., relative to non-overlapping filters, when employed with various mathematical linear combinations of responses).

Figure 10:
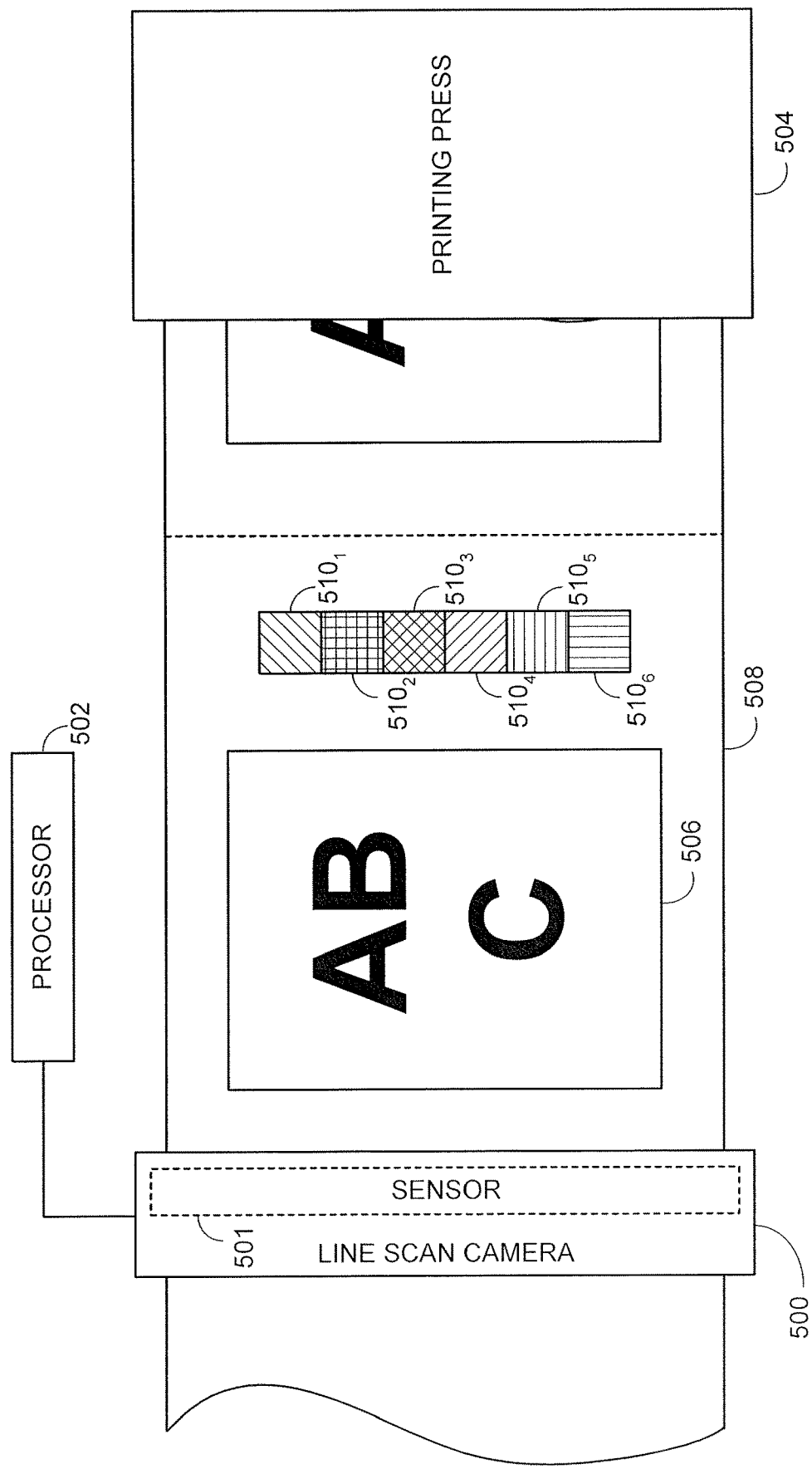
FIG. 10 is a schematic illustration of a combined spectral measurement and imaging line-scan camera employed for acquiring images, inspecting and for controlling the color of an image printed on a web, constructed and operative in accordance with another embodiment of the disclosed technique.

As mentioned above, a combined spectral measurement and imaging line-scan sensor according to the disclosed technique may be employed in a line scan camera. Such combined imaging and spectral measurement line-scan cameras may be employed in a printing press for either image acquisition, color measurement & control or inspection functionality. Reference is now made to FIG. 10, which is a schematic illustration of a combined imaging and spectral measurement line-scan camera, generally referenced 500, employed for viewing, inspecting and for measuring and/or controlling the color of an image 506 printed on a web 508, constructed and operative in accordance with another embodiment of the disclosed technique. Camera 500 employs a combined imaging and spectral measurement line-scan sensor 501. Sensor 501 may be similar to any one of the above described sensors 100 (FIG. 1), 150 (FIG. 2), 200 (FIG. 3), 230 (FIG. 4) and 250 (FIG. 5). Camera 500 is employed in a combined inspection and color control system for printing presses, which further includes a processor 502 coupled with line-scan camera 500. In the exemplary scenario depicted in FIG. 6, a printing press 504 prints an image 506 on a web 508. Printing press 502 further prints, for example, six color targets $510_1$-$510_6$ employed for color control. It is noted that in FIG. 6, color targets $510_1$-$510_6$ are depicted as being printed on the margins of image 506. However, color targets $510_1$-$510_6$ may alternatively be printed in the image or constitute a part of the printed image. In other words, regions within the image are designated for color control purposes.

Typically, the size of color targets $510_1$-$510_6$ are on the order of several millimeters square (e.g., 4 millimeters by 4 millimeters). Typically, the size of a magnified pixel (i.e., the size of a pixel in the field of view on the web) is on the order of tens to hundreds of micrometers. Thus, with reference to the example brought forth in FIGS. 2, 3 and 4, each spectral measurement of a single target is acquired by a group of pixels in the spectral measurement lines (e.g., lines $152_2$, $152_4$ and $152_6$—FIG. 2, lines $208_1$ and $208_2$—FIG. 3, lines $238_1$ and $238_2$—FIG. 4). However, the pixels acquiring the spectral measurement of a single target may not necessarily be from the same group of pixels (i.e., the groups that are depicted in FIGS. 2, 3 and 4). Rather, some of the spectral bands may be acquired by pixels from one group and the other spectral bands may be acquired by pixels from an adjacent group. For example, with reference to FIG. 2, spectral bands 670-710 in line $152_2$ may be acquired by pixels from the fourth group and spectral bands 600-680 may be acquired by pixels from the fifth group. As a similar example, with reference to FIG. 3, spectral bands 550-730 may be acquire by pixels from the third group and spectral bands 360-590 may be acquired by pixels from the fourth group.

During the print run, image 506 and color targets $510_1$-$510_6$ pass in front of camera 500 and camera 500 acquires a plurality of combined line images and spectral measurement. Camera 500 provides these combined line images and spectral measurement to processor 502. Processor 502 renders a two dimensional image (e.g., an RGB image) of the entire substrate width from images acquired by the imaging lines of sensor 501. Processor 502 may employ this two dimensional image to locate color targets $510_1$-$510_6$ in the image. Processor 502 then employs the location of color targets $510_1$-$510_6$ in the two dimensional image to determine the spectral measurement information associated with each of color targets $510_1$-$510_6$ from the corresponding pixels or groups of pixels in the spectral measurement lines of sensor 501. In essence, the spectral measurement information provides the spectral response of each of color targets $510_1$-$510_6$. Accordingly, processor 502 may determine the color associated with each of color targets $510_1$-$510_6$ in a selected color space (e.g., CIEL*a*b*, CIEL*u*v* and the like). The processor 502 may employ the two dimensional image to determine further press parameters such as pressure.

It will be appreciated by persons skilled in the art that the disclosed technique is not limited to what has been particularly shown and described hereinabove. Rather the scope of the disclosed technique is defined only by the claims, which follow.

The invention claimed is:

1. A combined imaging and spectral measurement line-scan sensor integrated on a single semiconductor substrate, said sensor comprising:
a plurality of pixel lines disposed on said single semiconductor substrate, each pixel line including a plurality of pixels, the plurality of pixel lines including one or more imaging lines configured for acquiring at least one image of an object, and one or more spectral measurement lines different from said one or more imaging lines and configured for acquiring a spectral measurement of light received from said object,
each imaging line associated with a single respective spectral response within a spectral range,
each pixel in each spectral measurement line associated with a respective pixel spectral band,
each of at least three pixels in each spectral measurement line associated with different respective pixel spectral bands, each of said different respective pixel spectral bands non-identical to any single spectral response associated with any of said one or more imaging lines; and
a composite filter exhibiting a multi-band spectral response, each band in said multi-band spectral response corresponding to the respective pixel spectral band associated with one of said plurality of pixels, said composite filter comprising at least three pairs of filters, each pair of filters including a respective wideband filter and a respective multi-band filter, wherein one of said pair is placed between the other of said pair and respective pixels of said plurality of pixels.

2. The combined imaging and spectral measurement line-scan imaging sensor according to claim 1, wherein each said spectral measurement line is divided into a plurality of groups of adjacent pixels, each of said plurality of groups associated with a same group spectral band range and each pixel in each said group associated with a respective pixel spectral band.

3. The combined imaging and spectral measurement line-scan imaging sensor according to claim 1, wherein a filter associated with a respective spectral band is placed over a group of at least three adjacent pixels completely covering a middle at least one of said at least three adjacent pixels, and
wherein only the pixels that are completely covered by the filter are configured to be read out.

4. The combined imaging and spectral measurement line-scan imaging sensor according to claim 1, wherein each of two adjacent groups of four pixels in said one or more spectral measurement lines are separated by two vertically adjacent pixels, said two vertically adjacent pixels covered with an opaque material.

5. The combined imaging and spectral measurement line-scan imaging sensor according to claim 1, wherein the spectral range of each of said imaging lines comprises one of:
a red spectral band;
a green spectral band;
a blue spectral band; and
an infrared spectral range.

6. The combined imaging and spectral measurement line-scan imaging sensor according to claim 1, wherein:
each said respective multi-band filter exhibits a bandwidth and a spectral response, said spectral response comprising a plurality of single bands, each single band having a single band bandwidth; and
each said respective wideband filter exhibits a bandwidth that is smaller than said respective multi-band filter bandwidth, but wider than each said single band bandwidth.

7. The combined imaging and spectral measurement line-scan imaging sensor according to claim 6, wherein respective wideband filters associated with the different respective pixel spectral bands have overlapping spectral sensitivity curves.

8. The combined imaging and spectral measurement line-scan imaging sensor according to claim 1, wherein the one or more spectral measurement lines includes at least two spectral measurement lines.

9. The combined imaging and spectral measurement line-scan imaging sensor according to claim 1, wherein said one or more imaging lines includes at least two imaging lines, each imaging line associated with a single respective spectral response within a spectral range.

10. The combined imaging and spectral measurement line-scan imaging sensor according to claim 9, wherein one or more pairs of said at least two imaging lines are separated by a metal strip.

11. The combined imaging and spectral measurement line-scan imaging sensor according to claim 9, wherein one or more pairs of said at least two imaging lines are separated by a gap.

12. The combined imaging and spectral measurement line-scan imaging sensor according to claim 1, comprising a metal strip separating at least one of said one or more imaging lines from at least one of said one or more spectral measurement lines.

13. The combined imaging and spectral measurement line-scan imaging sensor according to claim 1, comprising a gap separating at least one of said one or more imaging lines from at least one of said one or more spectral measurement lines.

14. The combined imaging and spectral measurement line-scan imaging sensor according to claim 1, wherein each of said one or more imaging lines includes three imaging lines.

15. A system for simultaneously acquiring both spectral measurements of color of an image printed on a web, at selected spectral bands, and an image for inspecting said image printed on said web, the system comprising a camera, said camera including the combined imaging and spectral measurement in-line scan sensor integrated on a single semiconductor substrate of claim 1.

16. The system of claim 15, wherein said web has a web width and the combined imaging and spectral measurement in-line scan sensor comprises a plurality of pixel lines, each pixel line comprising a plurality of pixels and having a pixel line width at least as wide as the web width, the plurality of pixel lines comprising one or more imaging lines configured to acquire at least one image of the web and one or more spectral measurement lines configured to acquire a spectral measurement of light received from the web.

17. The sensor of claim 1, wherein each pixel in each of said one or more imaging lines is associated with at least one respective pixel spectral band of at least one corresponding pixel in said one or more spectral measurement lines.

18. A system for inspecting the color of an image printed on a web, the system comprising:

a camera, said camera including a line scan sensor, said camera configured to acquire a plurality of combined line images and spectral measurements, said line scan sensor including:
  a plurality of pixel lines, each pixel line including a plurality of pixels, said plurality of pixel lines including one or more imaging lines configured to acquire at least one image of an object, and one or more spectral measurement lines configured to acquire a spectral measurement of light received from said object, each of said one or more imaging lines associated with a single respective spectral response within a spectral range, each pixel in said one or more spectral measurement lines associated with a respective spectral band, each of at least three pixels in each of said one or more spectral measurement lines associated with different respective pixel spectral bands, each of said different respective pixel spectral bands non-identical to any single spectral response associated with any of said one or more imaging lines;
  a composite filter exhibiting a multi-band spectral response, each band in said multi-band spectral response corresponding to the respective pixel spectral band associated with one of said plurality of pixels, said composite filter comprising at least three pairs of filters, each pair of filters including a respective wideband filter and a respective multi-band filter, wherein one of said pair is placed between the other of said pair and respective pixels of said plurality of pixels; and
  a processor coupled to said camera, configured to receive said plurality of combined line images and one or more spectral measurements from said camera, said processor configured to render a two dimensional image from said at least one image acquired by said one or more imaging lines, said processor further configured to determine spectral measurement information associated with each color target from one or more of said plurality of pixels in said one or more spectral measurement lines corresponding to a location of said color target.

19. The system according to claim 18, wherein said camera is configured to acquire a plurality of combined line images using Time Delay Integration.

20. A combined imaging and spectral measurement line-scan sensor integrated on a single semiconductor substrate, said sensor including a plurality of pixels and a composite filter, said composite filter comprising pairs of filters, each pair of filters including a respective wideband filter and a respective multi-band filter, wherein one of said pair is placed between the other one of said pair and respective pixels of said plurality of pixels.

21. The combined imaging and spectral measurement line-scan sensor according to claim 20, comprising a plurality of pixel lines including one or more imaging lines configured to acquire at least one image of an object.

22. The combined imaging and spectral measurement line-scan sensor according to claim 20, comprising a plurality of pixel lines including one or more spectral measurement lines configured to acquire a spectral measurement of light received from an object.

23. The combined imaging and spectral measurement line-scan sensor according to claim 21, wherein each of said one or more imaging lines is associated with a single respective spectral response within a spectral range.

24. The combined imaging and spectral measurement line-scan sensor according to claim 22, wherein each of said one or more spectral measurement lines comprises more than one pixel, each pixel associated with a respective spectral band.

25. The combined imaging and spectral measurement line-scan sensor according to claim 24, wherein each of said one or more spectral measurement lines comprises at least three pixels, each of the at least three pixels associated with a different pixel spectral band.

26. The combined imaging and spectral measurement line-scan sensor according to claim 25, wherein each different pixel spectral band is non-identical to any single spectral response associated with any of said one or more imaging lines.

27. The sensor of claim 20, wherein the composite filter exhibits a multi-band spectral response, each band in said multi-band spectral response corresponding to a respective pixel spectral band associated with one of said respective pixels.

28. The sensor of claim 20, wherein the respective wideband filter and the respective multi-band filter in each pair of filters have an overlapping spectral response.

29. The sensor of claim 20, wherein:
  each said respective multi-band filter exhibits a bandwidth and a spectral response, said spectral response comprising a plurality of single bands, each single band having a single band bandwidth; and
  each said respective wideband filter exhibits a bandwidth that is smaller than said respective multi-band filter bandwidth, but wider than each single band bandwidth.

30. The sensor of claim 20, wherein:
  the plurality of pixels are arranged in a plurality of pixel lines, at least one of said pixel lines embodying an imaging line configured for acquiring at least one image of an object and at least one of said pixel lines, different from said at least one imaging line, embodying a spectral measurement line, configured for acquiring a spectral measurement of light received from said object,
  each imaging line associated with a single respective spectral response within a spectral range,
  each pixel in each spectral measurement line associated with a respective pixel spectral band, and
  each of at least three pixels in each of said spectral measurement lines respectively associated with different respective pixel spectral bands, said different respective pixel spectral bands non-identical to any one of said single spectral responses associated with each said imaging line.

31. The sensor of claim 30, wherein each pixel in said at least one imaging line is associated with at least one respective pixel spectral band of an at least one corresponding pixel in said at least one spectral measurement line.

32. A combined imaging and spectral measurement line-scan imaging sensor, integrated on a single semiconductor substrate, said sensor comprising:
  a plurality of pixel lines, each pixel line including a plurality of pixels, the plurality of pixel lines including:
    at least one imaging line designated for acquiring at least one image of an object, and
    at least one spectral measurement line, different from said at least one imaging line, designated for acquiring a spectral measurement of light received from said object;
  each at least one imaging line associated with a single respective spectral response within a spectral range;
  each at least one pixel in each spectral measurement line associated with a respective pixel spectral band;

each of at least three pixels in each said at least one spectral measurement line respectively associated with different respective pixel spectral bands, said different respective pixel spectral bands each non-identical to the single spectral response associated with each said at least one imaging line;

wherein each of at least some of said pixels said imaging line is associated with a corresponding pixel in said spectral measurement line, and thus associated with the respective pixel spectral band of said corresponding pixel.

* * * * *